US006707584B1

(12) United States Patent
Morita

(10) Patent No.: US 6,707,584 B1
(45) Date of Patent: Mar. 16, 2004

(54) IMAGE SCANNER

(75) Inventor: Yuukichi Morita, Kanazawa (JP)

(73) Assignee: PFU Limited, Ishikawa (JP)

( * ) Notice: Subject to any disclaimer, the term of this patent is extended or adjusted under 35 U.S.C. 154(b) by 0 days.

(21) Appl. No.: 09/546,394

(22) Filed: Apr. 10, 2000

(30) Foreign Application Priority Data

Apr. 9, 1999 (JP) ............................................ 11-101965

(51) Int. Cl.$^7$ ................................................ H04N 1/04
(52) U.S. Cl. ...................... 358/498; 358/498; 358/497; 358/474
(58) Field of Search ................................ 358/474, 498, 358/497

(56) References Cited

U.S. PATENT DOCUMENTS 5,988,623 A * 11/1999 Worley et al. ............. 271/9.02

FOREIGN PATENT DOCUMENTS

DE 298 14 558 11/1998

* cited by examiner

Primary Examiner—Edward Coles
Assistant Examiner—Heather D Gibbs

(57) ABSTRACT

A flat-bed-type document scanner and an automatic-paper-feed-type document scanner are assembly integrally by use of first through third components to fabricate an image scanner. The first component is an assembly component which is prepared as a component which constitutes the automatic-paper-feed-type document scanner or a component to be attached to the automatic-paper-feed-type document scanner. The second component is an assembly structure member having a squarish U-shaped cross section and is adapted to be fitted onto a casing of the flat-bed-type document scanner. The assembly structure member has an engagement portion used for positioning of the assembly component, and a fixation portion used for fixation of the assembly component. The third component is a cover member disposed to cover the assembly structure member and the assembly component, and is fixed to the assembly structure member.

36 Claims, 31 Drawing Sheets

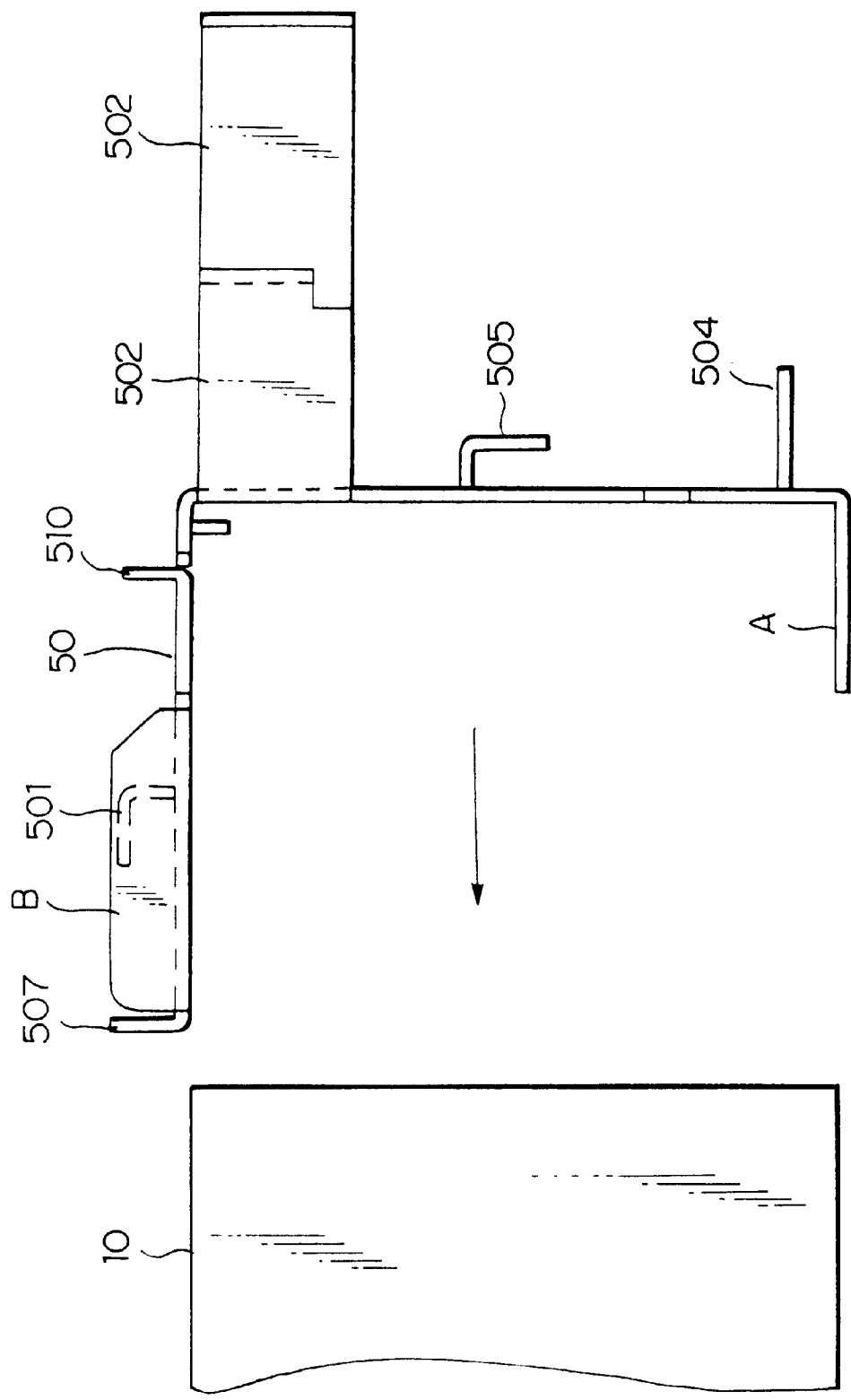

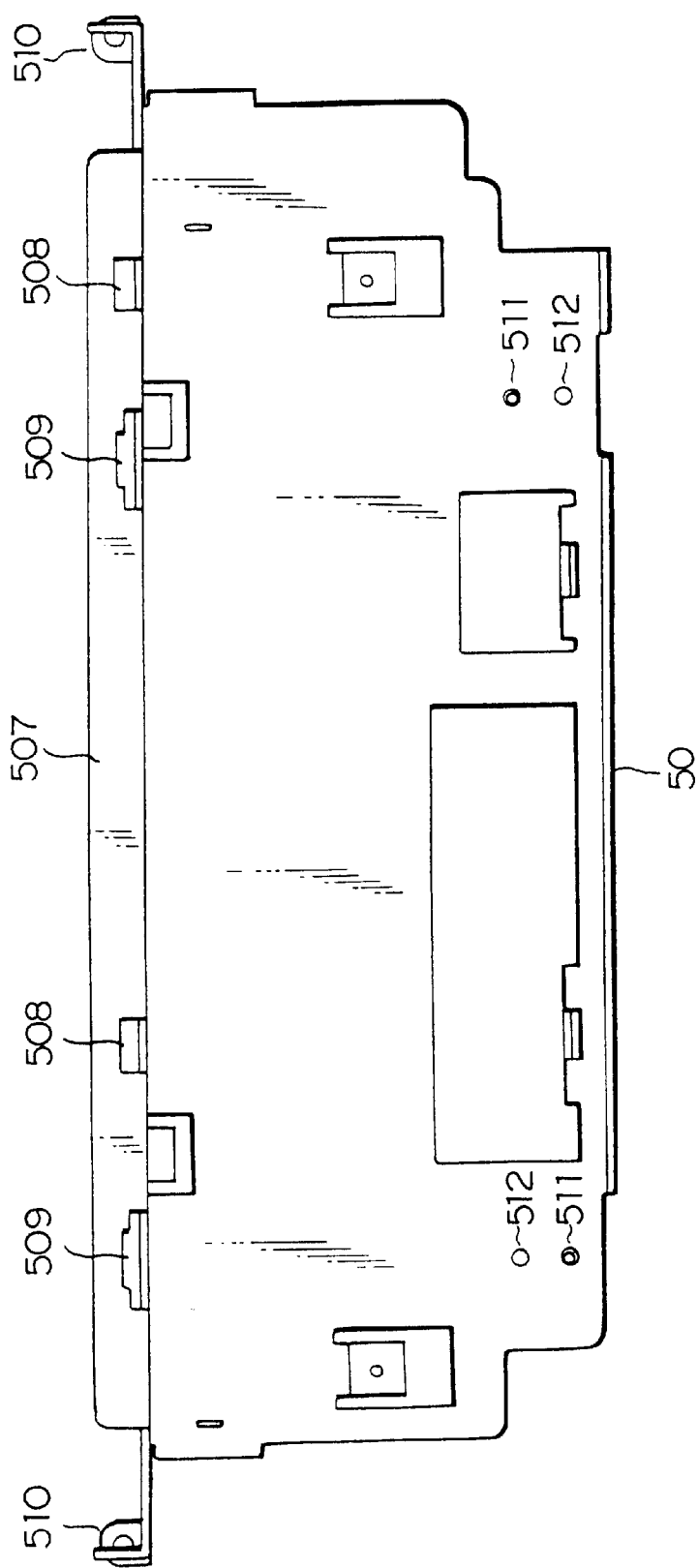

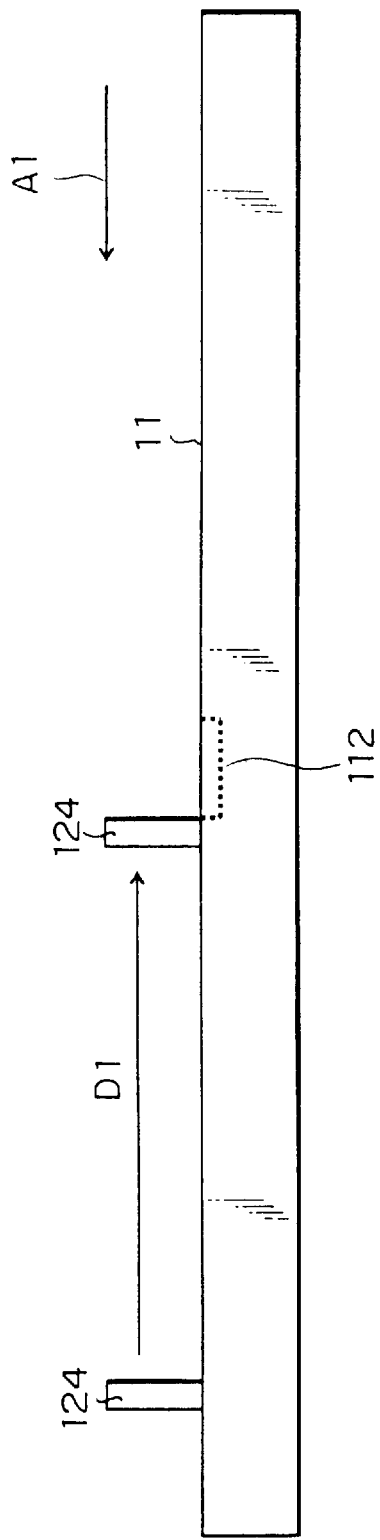
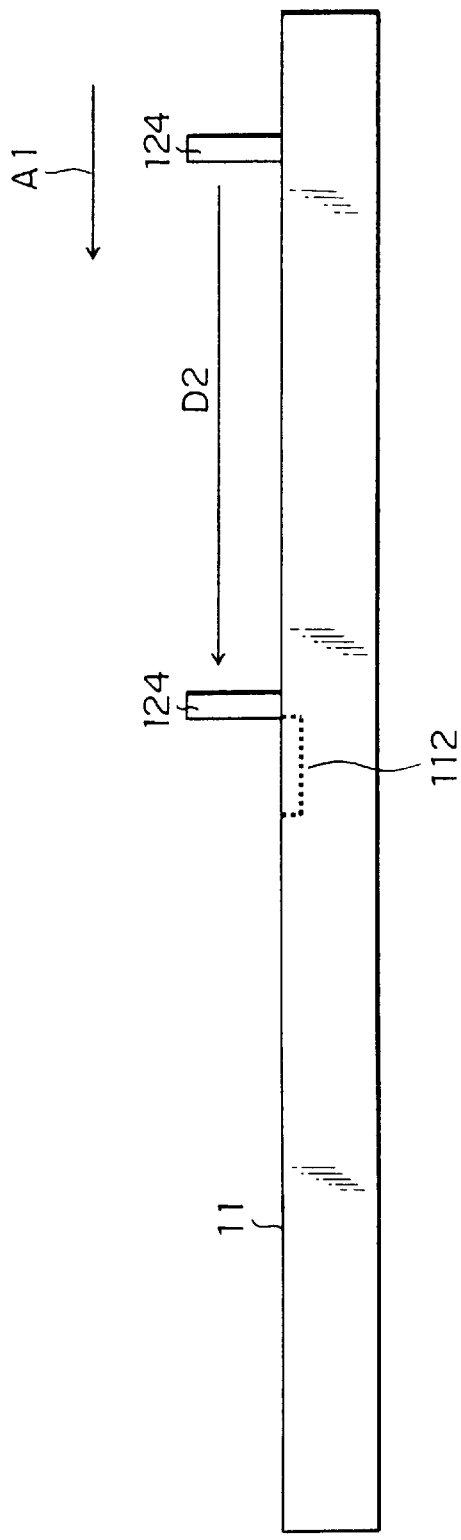

IMAGE SCANNER

BACKGROUND OF THE INVENTION

1. Field of the Invention

The present invention relates to an image scanner, and more particularly to an image scanner which fulfills two functions; i.e., a function corresponding to that of a flat-bed-type document scanner and a function corresponding to that of an automatic-paper-feed-type document scanner, and which can reduce a burden imposed on a manufacturer in design and manufacture of the scanner.

2. Description of the Related Art

Image scanners for reading images on documents can be divided into three types; i.e., a flat-bed-type document scanner in which an image is read from a document placed on a glass platen, through movement of a line image sensor; an automatic-paper-feed-type document scanner in which documents stacked in a hopper are pulled out and transferred a single sheet at a time, and an image is read from each sheet by use of a fixed line image sensor; and an image scanner which provides functions corresponding to those of the flat-bed-type document scanner and the automatic-paper-feed-type document scanner (herein after this image scanner may be referred to as a "dual-function image scanner").

Due to the necessity of providing two functions, such a dual-function image scanner involves various drawbacks, such as an increased number of models to be put on the market, and increased equipment cost. Therefore, there has been demand for a technique which can cope with the drawbacks.

As shown in FIG. 33, a dual-function image scanner 1 provides two separate image-scanner functions; i.e., a function corresponding to that of a flat-bed-type document scanner for reading a document which is placed on a glass platen 2, and a function corresponding to that of an automatic-paper-feed-type document scanner for picking documents from a hopper 3 one sheet at a time and reading each sheet while transporting it to a stacker 4.

Conventionally, a scanner manufacturer designs and manufactures such a dual-function image scanner as a single-body apparatus, as in the case of design and manufacture of a flat-bed-type document scanner or an automatic-paper-feed-type document scanner. Specifically, such a dual-function image scanner has been designed in order to enable the scanner to be fabricated and assembled into a single-body apparatus through a manufacturing process such that components which constitute the basic structure of the scanner are molded, and a mechanism for realizing the function of a flat-bed-type document scanner and a mechanism for realizing the function of an automatic-paper-feed-type document scanner are disposed on the basic structure so as to complete the dual-function image scanner.

However, such a conventional technique imposes a great burden on the scanner manufacture.

That is, the scanner manufacture must design and manufacture dual-function image scanners, in addition to designing and manufacturing flat-bed-type document scanners and automatic-paper-feed-type document scanners, with the result that the burden of design and manufacture increases considerably.

Further, since the dual-function image scanner fulfills two separate image scanner functions, the number of models to be put on the market increases with the number of combinations of specifications such as resolution, and document sizes, which further increases the burden imposed on the manufacturer.

SUMMARY OF THE INVENTION

In view of the foregoing, an object of the present invention is to provide an improved image scanner which can reduce burdens imposed on a manufacture, such as a design burden and a manufacture burden encountered in the course of design and manufacture of the scanner in order to provide a function of a flat-bed-type document scanner and a function of an automatic-paper-feed-type document scanner.

In order to achieve the above object, according to the one embodiment of the present invention, first and second components are prepared. The first component is an assembly component which is prepared as a component which constitutes an automatic-paper-feed-type document scanner or a component to be attached to the automatic-paper-feed-type document scanner. The second component is an assembly structure member having a squarish U-shaped cross section and is adapted to be fitted onto a casing of a flat-bed-type document scanner. The assembly structure member has an engagement portion used for positioning of the assembly component, and a fixation portion used for fixation of the assembly component.

While the assembly component is positioned by use of the engagement portion of the assembly structure member, the assembly component is fixed to the assembly structure member by use of the fixation portion of the assembly structure member. Thus, the flat-bed-type document scanner and the automatic-paper-feed-type document scanner are assembled together. The present invention enables assembly of a flat-bed-type document scanner fabricated as a single-body apparatus and an automatic-paper-feed-type document scanner fabricated as an apparatus.

According to the another embodiment of the present invention, third components are further prepared. The third component is a cover member disposed to cover the assembly structure member and the assembly component, and is fixed to the assembly structure member. The cover member is fixed to the assembly structure member in order to cover the assembly structure member and the assembly component, which would otherwise be exposed to the outside after the assembly. Accordingly, the completed image scanner has an appearance as if it were manufactured as a single-body apparatus.

The completed image scanner appears as if it were fabricated as a single-body apparatus. Therefore, a scanner manufacture becomes possible to provide an image scanner having two functions; i.e., a function of a flat-bed-type document scanner and a function of an automatic-paper-feed-type document scanner, though assembly of an existing flat-bed-type document scanner and an existing automatic-paper-feed-type document scanner. Thus, burdens imposed on a manufacture, such as a design burden and a manufacture burden, can be reduced considerably.

BRIEF DESCRIPTION OF THE DRAWINGS

FIGS. 3–6 show an example of an assembly structure member;

FIGS. 28A and 28B are explanatory views showing a moving area of the document stopping portion;

FIG. 31 is an explanatory view showing a state of attachment of the rotary shaft member;

DESCRIPTION OF THE PREFERRED EMBODIMENT

An embodiment of the present invention will be described.

Figure 1:
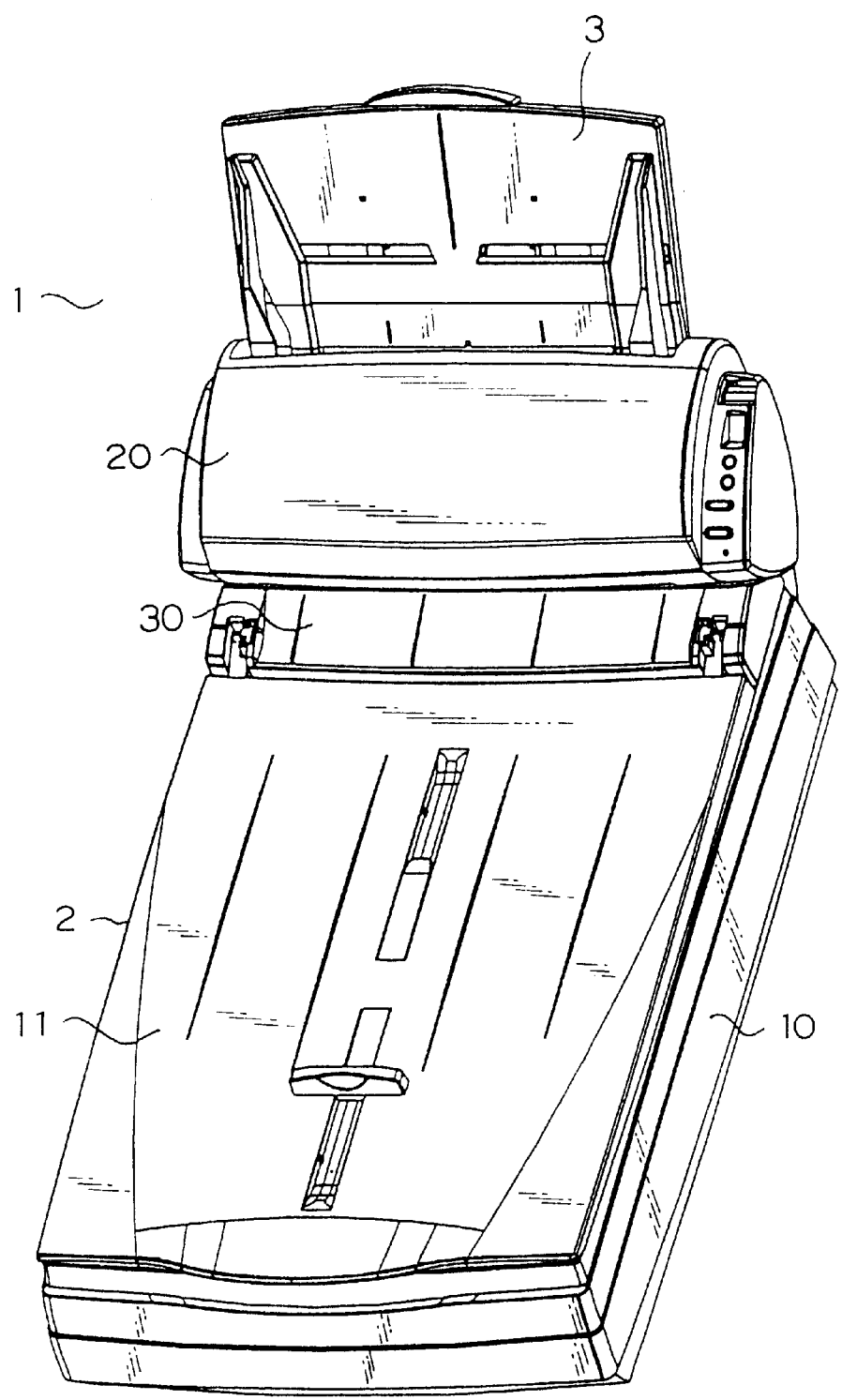
FIGS. 1 and 2 show an embodiment of the present invention.

FIG. 1 shows the embodiment of the present invention. As shown in FIG. 1, an image scanner 1 of the present invention employs a structure in which a flat-bed-type document scanner 10 fabricated as a single-body apparatus and an automatic-paper-feed-type document scanner 20 fabricated as a single-body apparatus are assembled together in such a manner that the completed image scanner 1 appears as if it were fabricated as a single-body apparatus. In the image scanner 1 of the present invention shown in FIG. 1, a hopper 3 for stacking documents to be read is disposed to project from an apparatus body; and in place of a stacker which have been used in conventional scanners, a document holding cover 11 provided on a platen 2 of the flat-bed-type document scanner 10 is used as a location to which documents are transported after being read.

Figure 2:
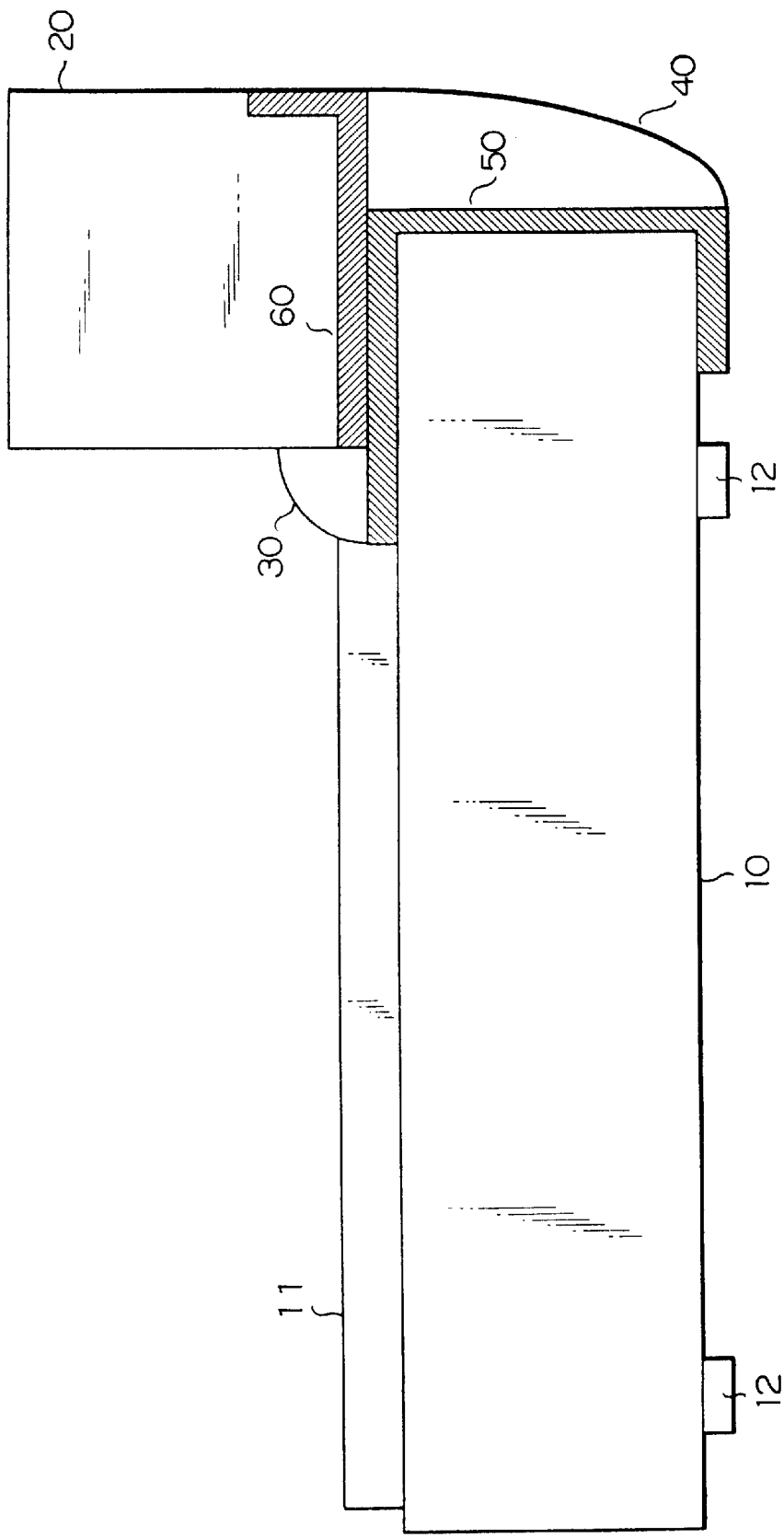

FIG. 2 shows an exemplary structure of the present invention. As shown in FIG. 2, the image scanner 1 of the present invention comprises an assembly structure member 50, a bottom structure member 60, a front connection cover 30, and a rear connection cover 40.

The assembly structure member 50 is used to assemble the flat-bed-type document scanner 10 fabricated as a single-body apparatus and the automatic-paper-feed-type document scanner 20 fabricated as a single-body apparatus such that the completed image scanner 1 appears as if it were fabricated as a single-body apparatus. For such a purpose, the assembly structure member 50 has a squarish U-shaped cross section and is fitted onto and screwed to the flat-bed-type document scanner 10 such that the open side of the squarish U-shape is directed to the scan direction of the flat-bed-type document scanner 10. The bottom structure member 60 constitutes the bottom of the automatic-paper-feed-type document scanner 20 and is screwed to the assembly structure member 50 such that the automatic-paper-feed-type document scanner 20 can discharge read documents onto the document holding cover 11 of the flat-bed-type document scanner 10. The front connection cover 30 is provided on the top face of the flat-bed-type document scanner 10 in order to cover exposed portions of the assembly structure member 50 and the bottom structure member 60. The rear connection cover 40 is provided on the back face of the flat-bed-type document scanner 10 in order to cover exposed portions of the assembly structure member 50 and the bottom structure member 60.

As shown in FIG. 2, the assembly structure member 50 has a squarish U-shaped cross section. That is, the cross section of the assembly structure member 50 has a U-like shape whose corners are not rounded but are squarish. In other words, the cross section has a shape obtained through combination of two L-shaped elements of different sizes. The cross-sectional shape of the assembly structure member 50 corresponds to the external shape of the flat-bed-type document scanner 10 and is therefore determined on the basis of the external shape. As shown in FIG. 2, among two leg portions of the U-like shape, the leg portion on which the automatic-paper-feed-type document scanner 20 is placed is rendered longer than the other leg portion.

As will be understood from the following description, the assembly structure member 50 may have any cross-sectional shape, insofar as the assembly structure member 50 comes into contact with at least a first face (upper face or face on which the automatic-paper-feed-type document scanner 20 is placed) of a casing of the flat-bed-type document scanner 10, and a second face (lower face) opposed to the first face.

Preferably, the assembly structure member 50 has a cross-sectional shape such that the assembly structure member 50 comes into contact with the first face (upper face) of the casing of the flat-bed-type document scanner 10, the second face (lower face) opposed to the first face, and a third face (side face) between the first and second faces. In this case, as shown in FIG. 2, surfaces of the assembly structure member 50—which respectively come into contact with the first face (upper face) of the casing of the flat-bed-type document scanner 10, the second face (lower face) opposed to the first face, and the third face (side face) between the first and second faces—are perpendicular to one another. Reference numeral 12 in FIG. 2 denotes rubber feet attached to the bottom face of the flat-bed-type document scanner 10.

Figure 3:
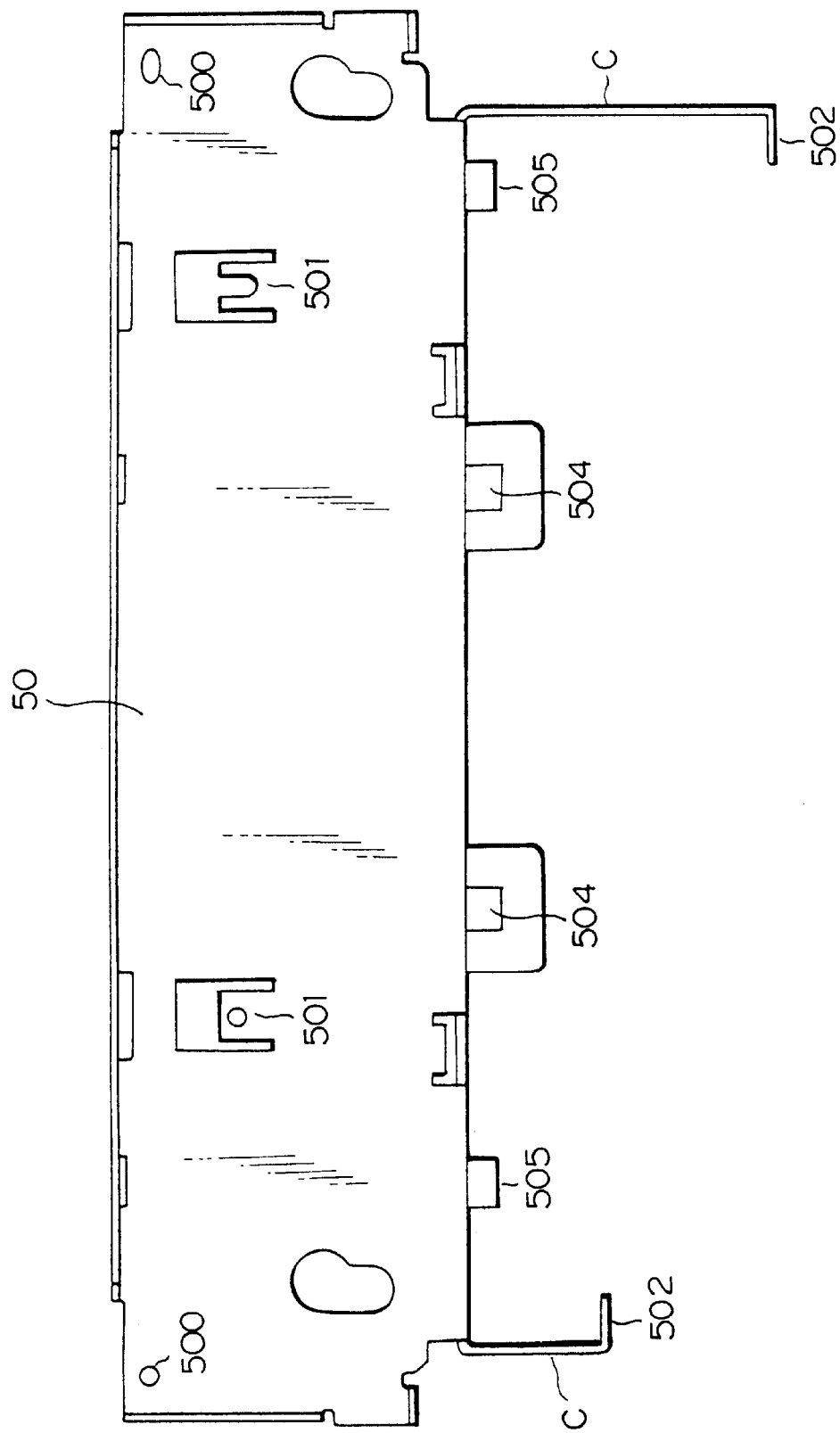
Figure 4:
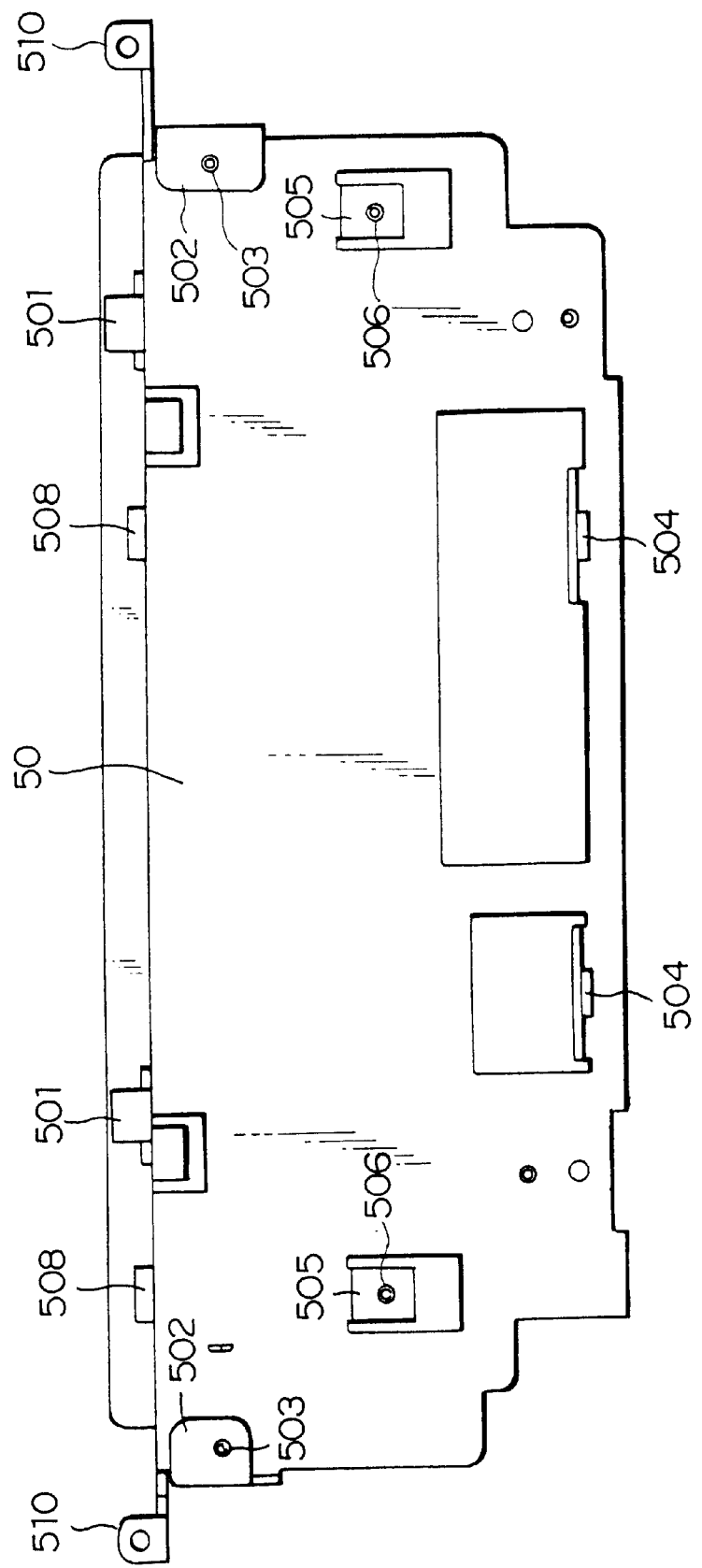

FIGS. 3 to 6 show an example of the assembly structure member 50 formed from sheet metal. Among these drawings, FIG. 3 is a plan view of the assembly structure member 50 (as viewed from the automatic-paper-feed-type document scanner 20); FIG. 4 is a rear view of the assembly structure member 50 (as viewed toward the flat-bed-type document scanner 10); FIG. 5 is a side view of the assembly structure member 50; and FIG. 6 is a front view of the assembly structure member 50 (as viewed from the flat-bed-type document scanner 10).

The assembly structure member 50 shown in these drawings has a basic structure portion having a squarish U-shaped sectional shape, as shown in FIG. 5. The assembly structure member 50 is screwed to the flat-bed-type document scanner 10 by use of two through-holes 500 shown in FIG. 3, so that the structure portion formed in a squarish U-shaped sectional shape is fitted onto the flat-bed-type document scanner 10.

Two projecting portions 501 shown in FIG. 3 project upward, and the flat end portions thereof are bent at right angles. A through-hole for screw receipt and a cut for screw receipt are formed in the bent flat end portions. The flat end portions come into contact with the bottom structure member 60. As will be described later, the bottom structure member 60 is attached to the assembly structure member 50 by use of the though hole and cut formed in the flat end portions of the projecting portions 501.

As shown in FIGS. 3 and 4, two L-shaped arm portions 502 each have a screw hole 503 formed in the flat end portions thereof. As will be described later, the rear connection cover 40 is attached to the assembly structure member 50 by use of the screw holes 503 and two flat portions 504 each having an opening shown in FIG. 3.

As shown in FIGS. 3 and 4, two projecting portions 505 project rearward, and the flat end portions thereof are bent at right angles. Screw holes 506 are formed in the bent flat end portions. As will be described later, the bottom structure member 60 is attached to the assembly structure member 50 by use of the screw holes 506.

As shown in FIGS. 5 and 6, bent portions 507 are formed through upward bending of an edge portion of the assembly structure member 50. The bent portion 507 has two rectangular openings 508 and two rectangular openings 509 having a recess on the upper side.

As shown in FIG. 4, two through-holes 510 are formed in a flat portion which is bent toward the same direction as is the bent portion 507. As will be described later, the front connection cover 30 is attached to the assembly structure member 50 by use of the through-holes 501 and the openings 508 formed in the bent portion 507.

Paired screw holes 511 and through-holes 512 shown in FIG. 6 are used for attachment of L-shaped reinforcement members 51 each having a hook portion 52 at the tip end thereof, as shown in FIG. 7. As shown in FIG. 8, the hook portion 52 of each reinforcement member 51 is engaged with a groove or stepped portion formed on the bottom face of the flat-bed-type document scanner 10, which enables reliable attachment of the assembly structure member 50 to the flat-bed-type document scanner 10.

Figure 9:
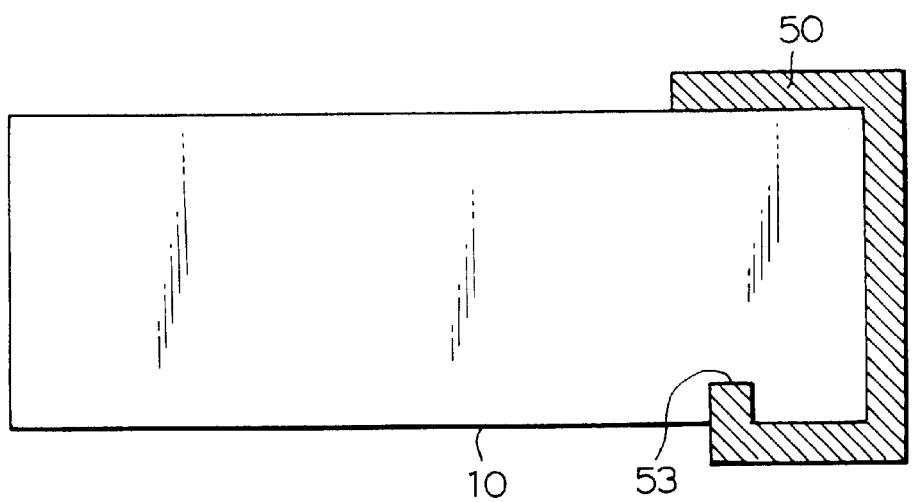
FIG. 9 shows another example of the assembly structure member.

When the groove or stepped portion formed on the bottom face of the flat-bed-type document scanner 10 extends transversely over the entire width of the flat-bed-type document scanner 10, as shown in FIG. 9, the assembly structure member 50 may have a hook portion 53 which is engaged with the groove or stepped portion formed on the bottom face of the flat-bed-type document scanner 10.

The assembly structure member 50 shown in FIG. 3 to FIG. 6 is screwed to the top face of the flat-bed-type document scanner 10 by use of the through-holes 500. However, when screw holes are present on the bottom face of the flat-bed-type document scanner 10, the assembly structure member 50 is preferably screwed to the bottom face of the flat-bed-type document scanner 10 as well.

Figure 10:
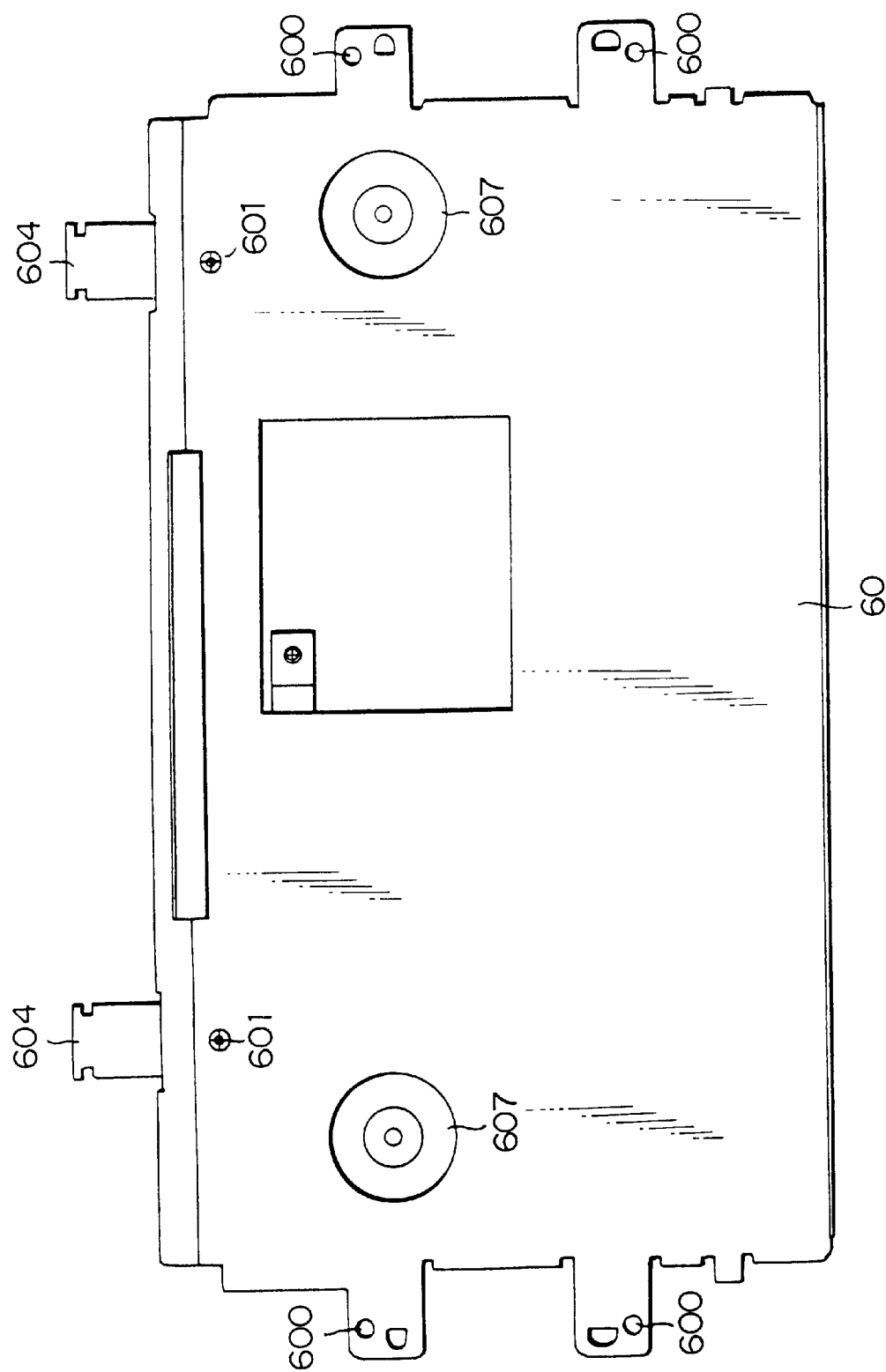
FIGS. 10, 11, and 12 show an example of a bottom structure member.
Figure 11:
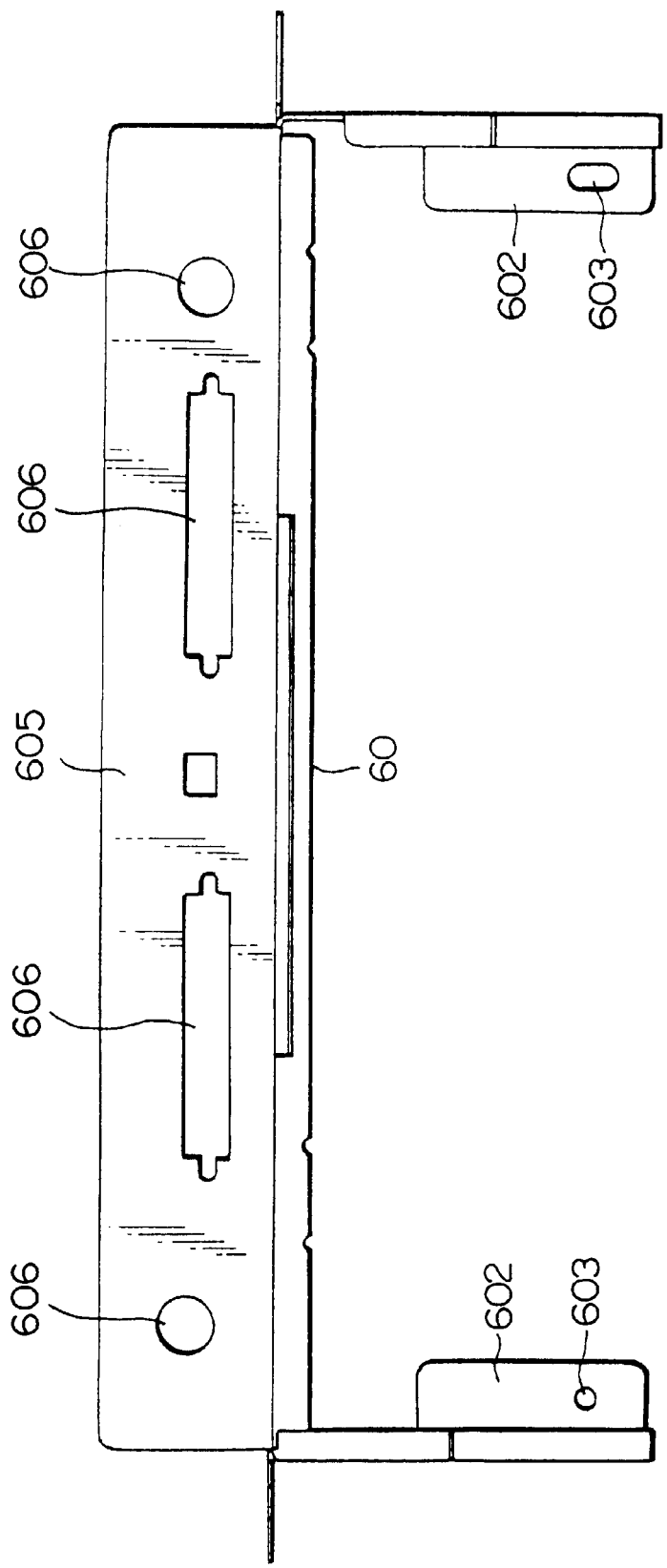
Figure 12:
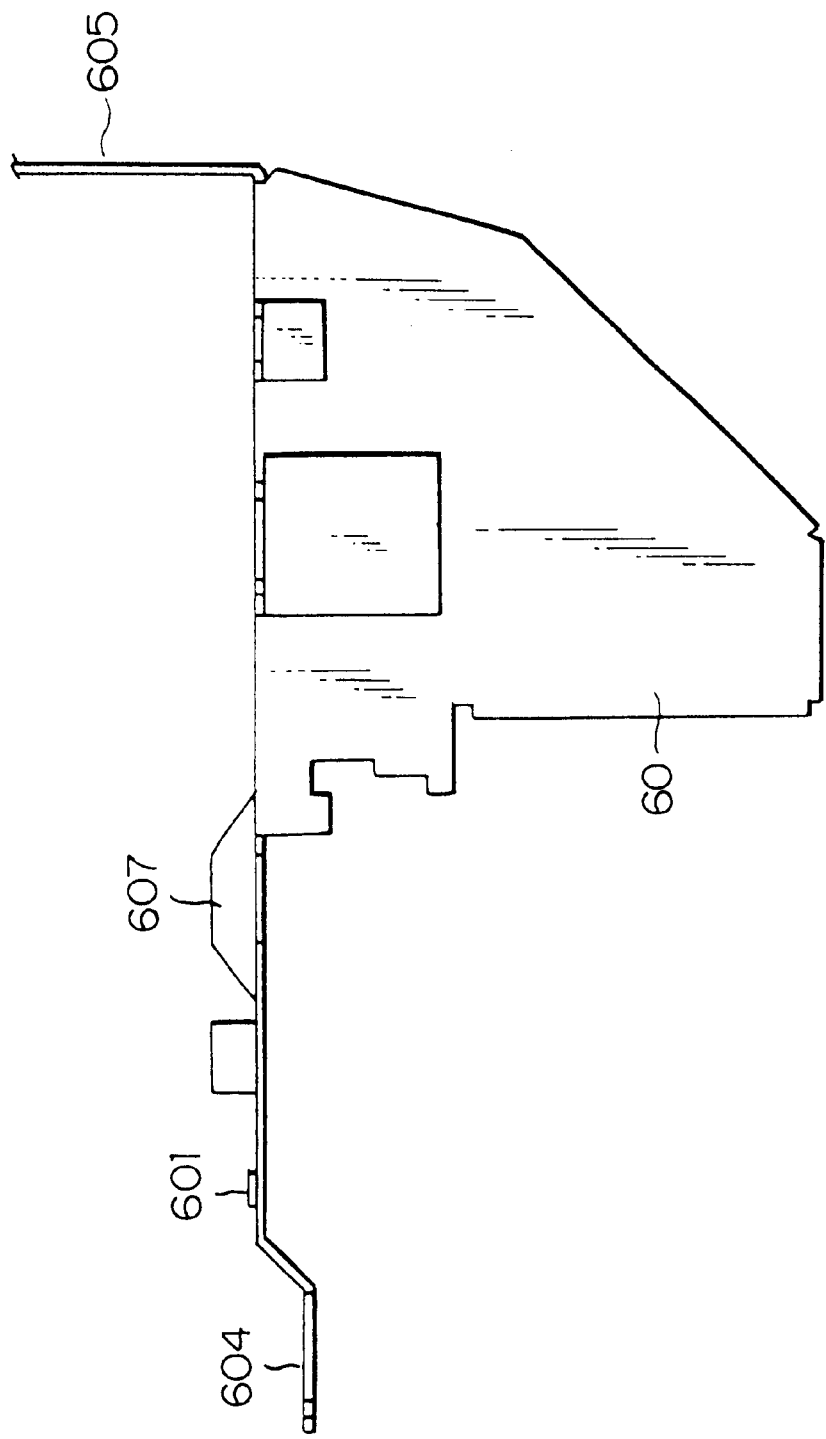

FIGS. 10 to 12 show an example of the bottom structure member 60 formed from sheet metal. Among these drawings, FIG. 10 is a plan view of the bottom structure member 60 (as viewed from the automatic-paper-feed-type document scanner 20); FIG. 11 is a rear view of the bottom structure member 60 (as viewed toward the flat-bed-type document scanner 10); and FIG. 12 is a side view of the bottom structure member 60.

The bottom structure member 60 having the structure shown in these drawings is prepared as a component for forming the bottom face of the automatic-paper-feed-type document scanner 20. As shown in FIG. 11, the bottom structure member 60 has a basic structure such that opposite lateral ends are bent downward (or vertically) and therefore the bottom structure member 60 has a squarish U-shaped sectional shape. The bottom structure member 60 is screwed to the automatic-paper-feed-type document scanner 20 by use of four through-holes 600 shown in FIG. 10.

A pair of screws penetrating the projecting portions 501 of the assembly structure member 50 are screwed into screw holes 601 shown in FIG. 10, and another pair of screws are inserted into through-holes 603 formed in flat portions of vertical portions 602 shown in FIG. 11 and are screwed into the screw holes 506 of the assembly structure member 50. Thus, the bottom structure member 60 is attached to the assembly structure member 50.

Positioning between the bottom structure member 60 and the assembly structure member 50 is effected through engagement of cut-out portions of two positioning portions 604 shown in FIG. 10 with the openings 509 (having recessed sides) of the assembly structure member 50 shown in FIG. 6.

As shown in FIGS. 11 and 12, a bent portion 605 is formed through upward bending of an edge portion of the bottom structure member 60. The bent portion 605 has openings 606 for attachment of components, such as a connector, which the automatic-paper-feed-type document scanner 20 requires. A drawn portion 607 having the shape of a truncated cone shown in FIG. 10 is provided for attachment of a printed circuit board of the automatic-paper-feed-type document scanner 20.

Figure 13:
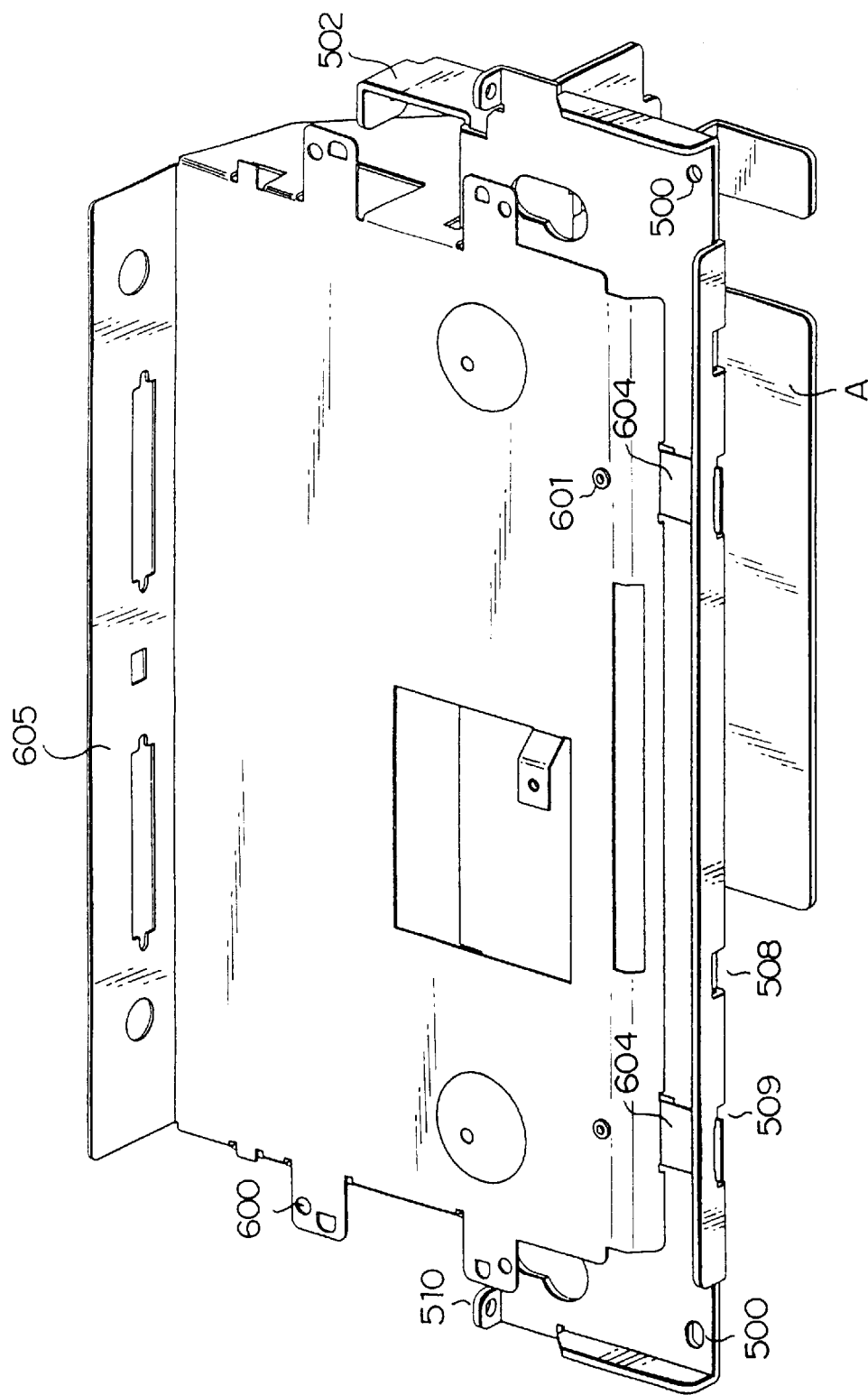
FIGS. 13 and 14 are views used for describing assembly of the assembly structure member and the bottom structure member.
Figure 14:
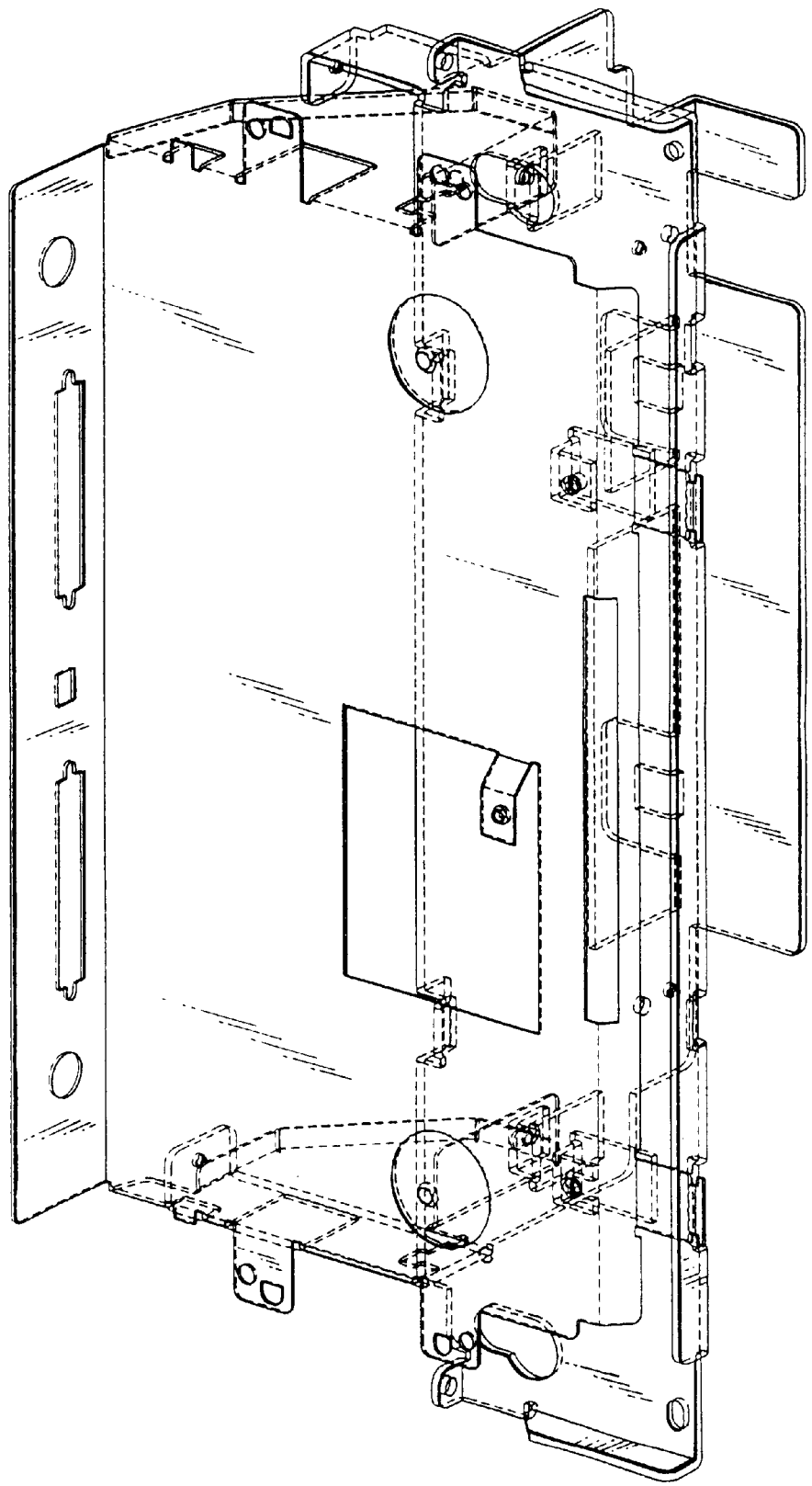

FIGS. 13 and 14 show a state in which the assembly structure member 50 and the bottom structure member 60 are assembled together. Face A in FIG. 13 corresponds to face A in FIG. 5.

As described above, the image scanner 1 of the present invention employs a structure in which, through use of the assembly structure member 50 fitted onto and screwed to the flat-bed-type document scanner 10 and the bottom structure member 60 screwed to the assembly structure member 50, the flat-bed-type document scanner 10 fabricated as a single-body apparatus and the automatic-paper-feed-type document scanner 20 fabricated as a single-body apparatus 10 are assembled such that the flat-bed-type document scanner 10 is located at a lower position and the automatic-paper-feed-type document scanner 20 is located at an upper position.

As shown in FIG. 5, the assembly structure member 50 attached to the flat-bed-type document scanner 10 has a squarish U-shaped cross-sectional shape and is adapted to come in contact with the top, rear, and bottom faces of the flat-bed-type document scanner 10. Therefore, the weight of the automatic-paper-feed-type document scanner 20 does not act on the flat-bed-type document scanner 10. Further, even when a user lifts the automatic-paper-feed-type document scanner 20, the lifting force does not act on the flat-bed-type document scanner 10.

Accordingly, in the image scanner 1 of the present invention, the automatic-paper-feed-type document scanner 20 can be attached to the flat-bed-type document scanner 10 without application of weight or force onto the flat-bed-type document scanner 10, which application would otherwise occur during an assembly operation such that the automatic-paper-feed-type document scanner 20 fabricated as a single-body apparatus 10 is placed on the flat-bed-type document scanner 10 fabricated as a single-body apparatus in order to provide the image scanner 1 with two functions; i.e., the function of the flat-bed-type document scanner and the function of the automatic-paper-feed-type document scanner.

Figure 7A:
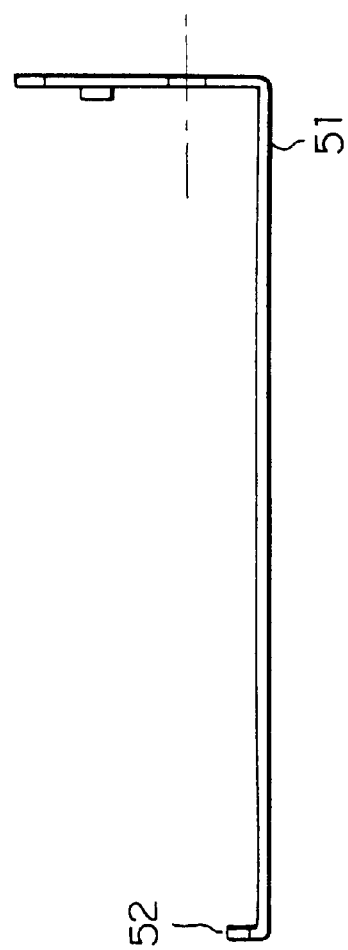
FIGS. 7A, 7B, and 8 are views used for explanation of a reinforcement member.
Figure 7B:
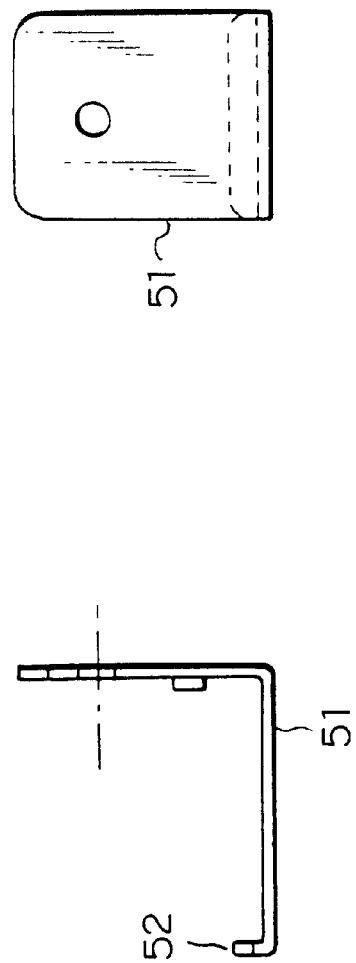
Figure 8:
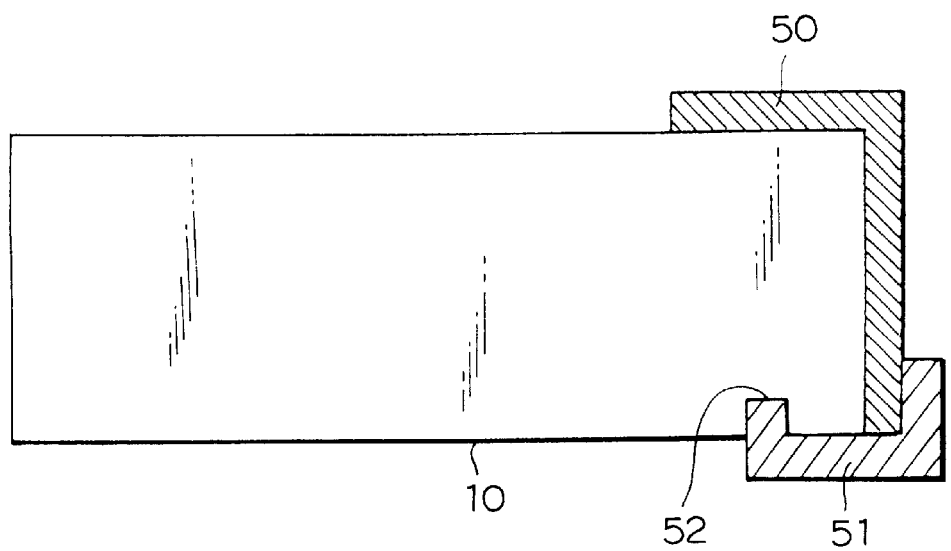

At this time, the assembly structure member 50 can be attached to the flat-bed-type document scanner 10 more securely, through use of the reinforcement members 51 shown in FIGS. 7A and 7B or through employment of the assembly structure member 50 having the structure shown in FIG. 8. In this case, when a user lifts the automatic-paper-feed-type document scanner 20, the lifting force can be preferably dispersed.

Meanwhile, as shown in FIG. 11, the bottom structure member 60 has a vertically (or downward) bent structure having a squarish U-shaped cross section. Therefore, the bottom structure member 60 receives the weight of the automatic-paper-feed-type document scanner 20 in a dispersed manner, which renders stronger the attachment of the automatic-paper-feed-type document scanner 20.

As described above, the positioning between the assembly structure member 50 and the bottom structure member 60 is effected through engagement of cut-out portions of two positioning portions 604 shown in FIG. 10 with the openings 509 (having recessed sides) of the assembly structure member 50 shown in FIG. 6.

As shown in FIG. 10, the cut-out portions of the positioning portions 604 having a shape corresponding to that of the recesses of the openings 509 enables accurate positioning. Further, since the positioning portions 604 have a plate-like shape and therefore have some degree of flexibility, which facilitates engagement operation.

When the flat-bed-type document scanner 10 and the automatic-paper-feed-type document scanner 20 are assembled by use of the assembly structure member 50 and the bottom structure member 60 having the above-described structures, the assembly structure member 50 and the bottom structure member 60 are exposed to the outside, which impairs the unified appearance of the apparatus.

In order to solve the problem, as shown in FIG. 2, the image scanner 1 of the present invention comprises the front connection cover 30 which is provided on the top face of the flat-bed-type document scanner 10 in order to cover exposed portions of the assembly structure member 50 and the bottom structure member 60, as well as the rear connection cover 40 which is provided on the back face of the flat-bed-type document scanner 10 in order to cover exposed portions of the assembly structure member 50 and the bottom structure member 60.

Figure 15:
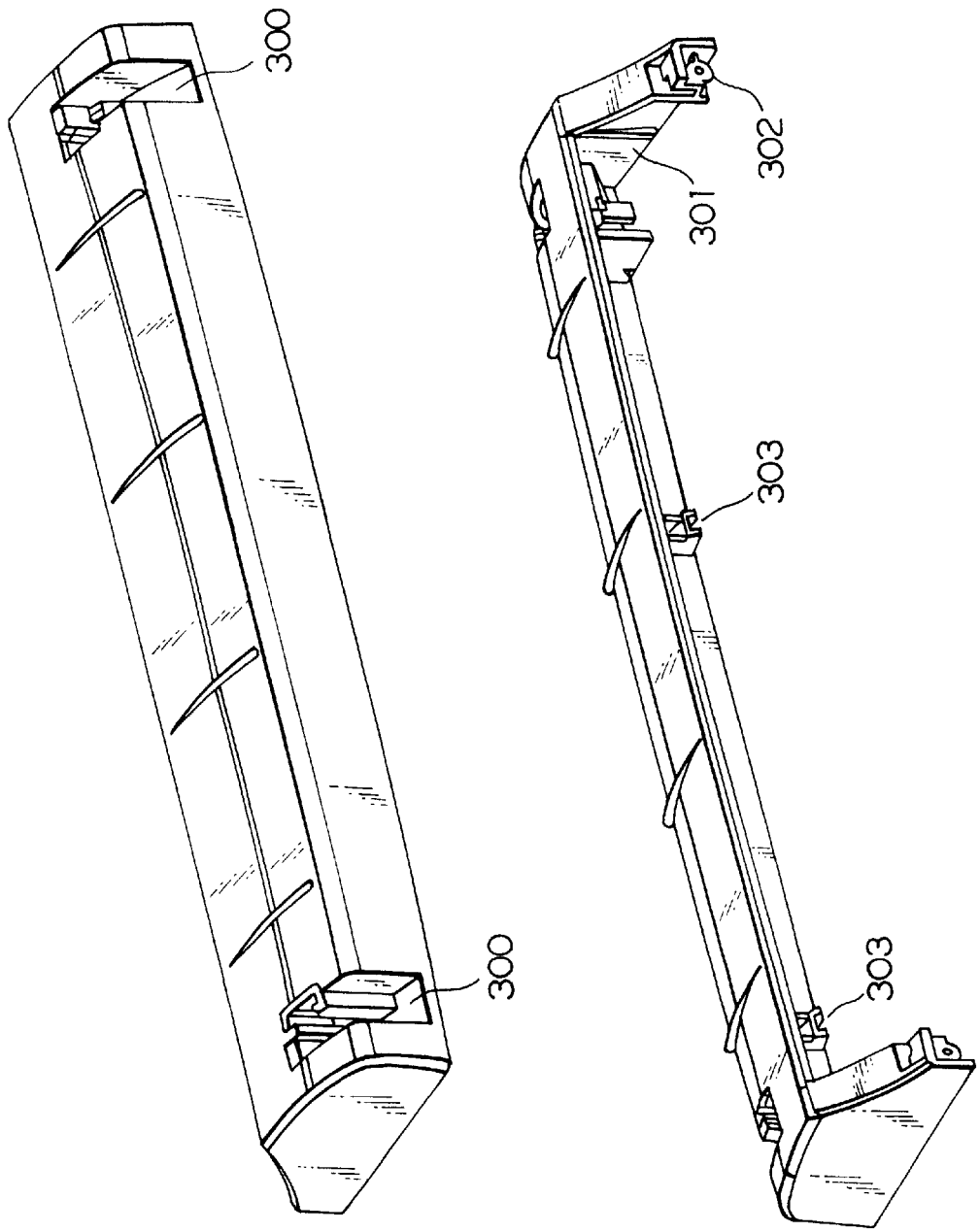
FIGS. 15–17 show an example of a front connection cover.
Figure 16:
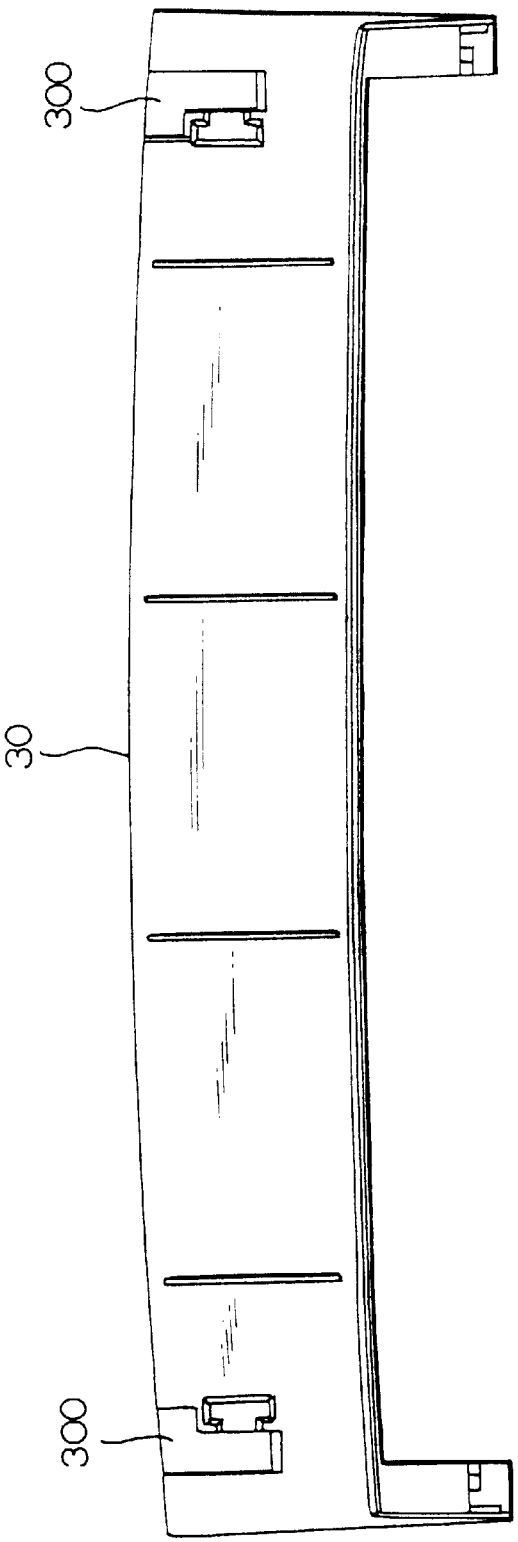
Figure 17:
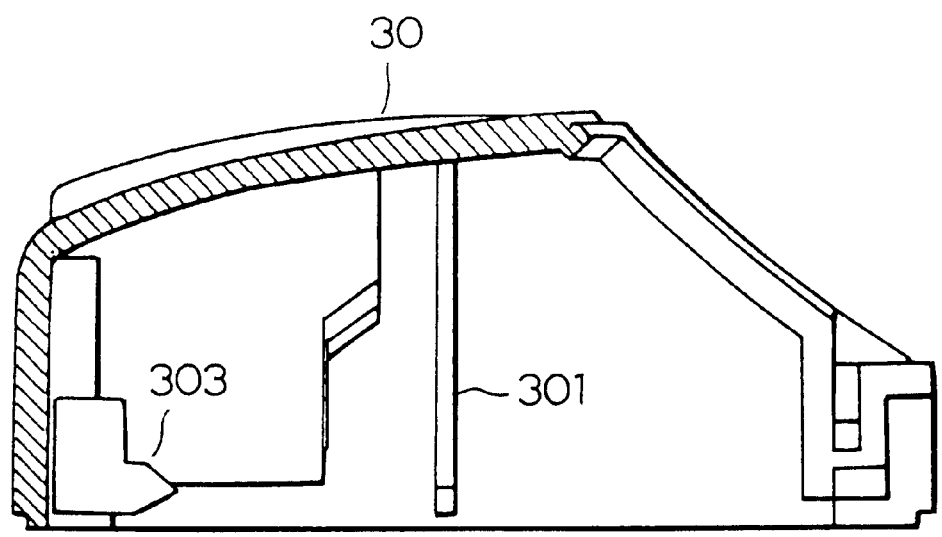

FIGS. 15 to 17 show an example of the front connection cover 30. Among these drawings, FIG. 15A and FIG. 15B are views showing the external appearance of the front connection cover 30; FIG. 16 is a plan view of the front connection cover 30 (as viewed from the automatic-paper-feed-type document scanner 20); and FIG. 17 is a cross section of the front connection cover 30 as viewed from the side thereof.

As shown in FIGS. 15A and 15B, the front connection cover 30 has two cut-out spaces 300 for enabling opening/closing of the document holding cover 11 shown in FIG. 1; two guide ribs 301 formed on the inner surfaces of opposite side walls; two screw holes 302 provided at the tip ends of the side walls; and two engagement projections 303 provided on the inner surface of the front wall. As shown in FIG. 17, the engagement projections 303 each have a tapered tip end in order to enable smooth engagement.

The front connection cover 30 having the above-described structure is fitted onto the assembly structure member 50, while the guide ribs 301 are brought into engagement with the surface B of the assembly structure member 50 shown in FIG. 5. When the engagement projections 303 are engaged with the openings 508 of the assembly structure member 50, positioning for attachment is completed. Subsequently, screws are inserted into the through-holes 510 shown in FIG. 4 and are screwed into the screw holes 302. Thus, the front connection cover 30 is fixed to the assembly structure member 50.

In this manner, the front connection cover 30 covers the exposed portions of the assembly structure member 50 and the bottom structure member 60, which portions would otherwise be exposed on the front side. Therefore, the image scanner obtained through assembly of the flat-bed-type document scanner 10 and the automatic-paper-feed-type document scanner 20 can have an appearance as if it were manufactured as a single-body apparatus.

Figure 18:
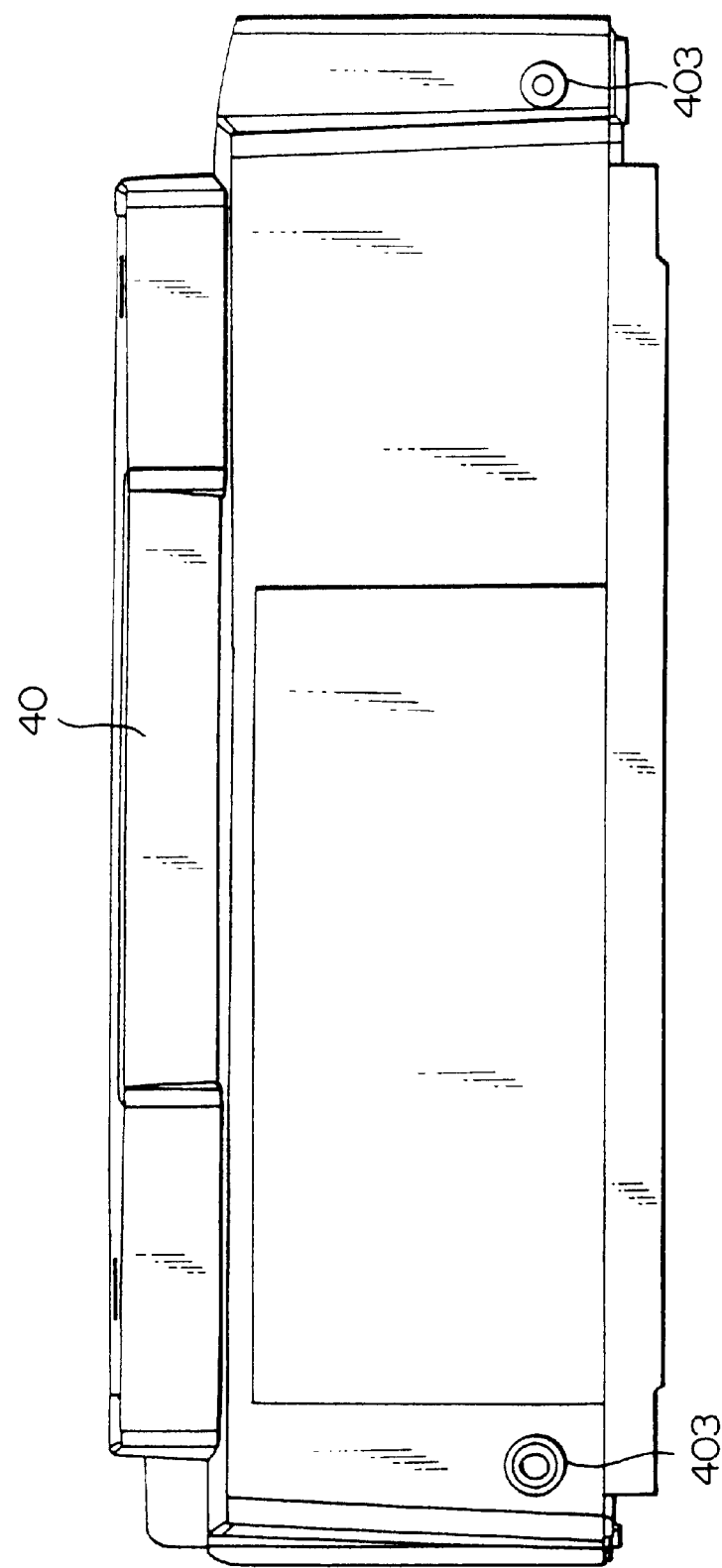
FIGS. 18–20 show an example of a rear connection cover.
Figure 19:
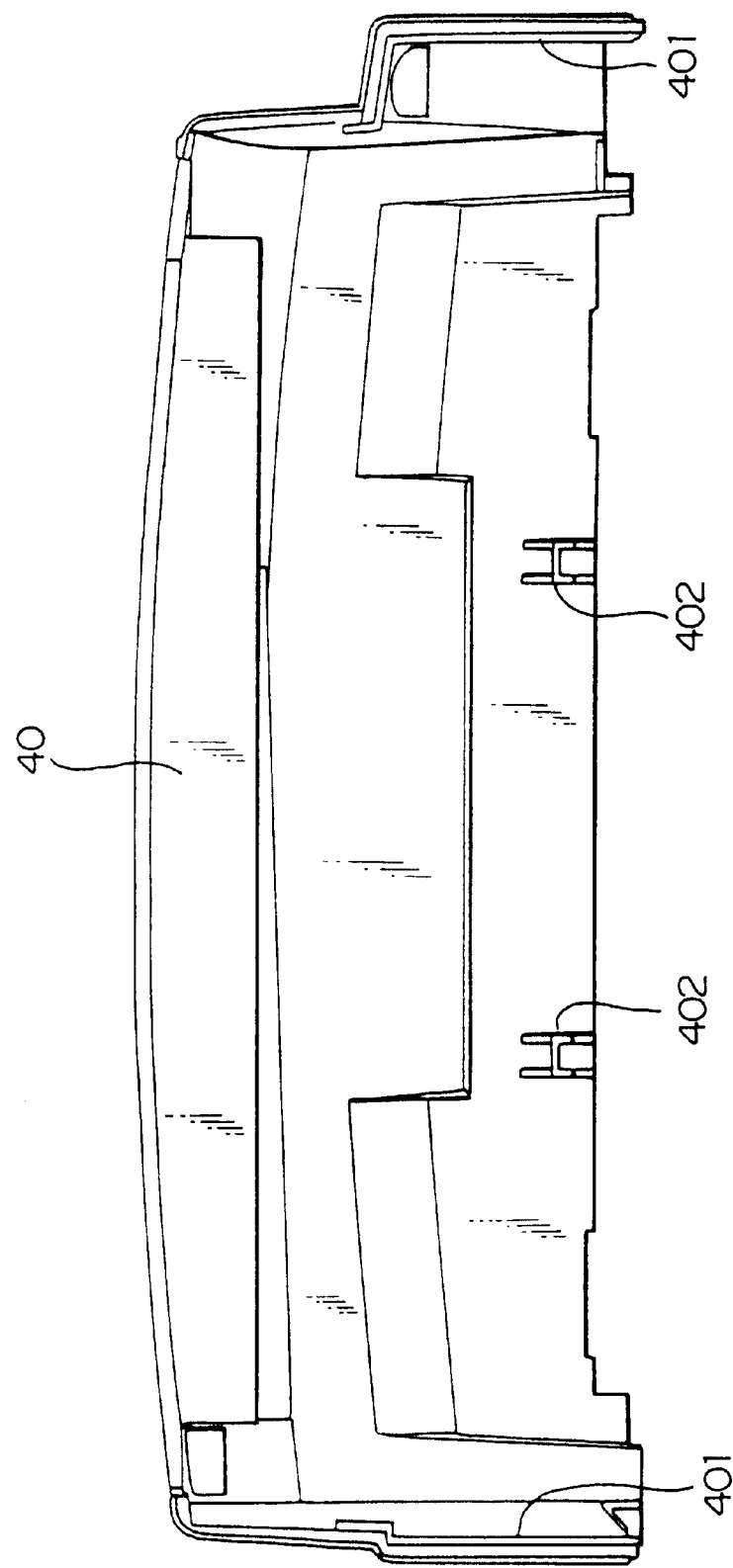
Figure 20:
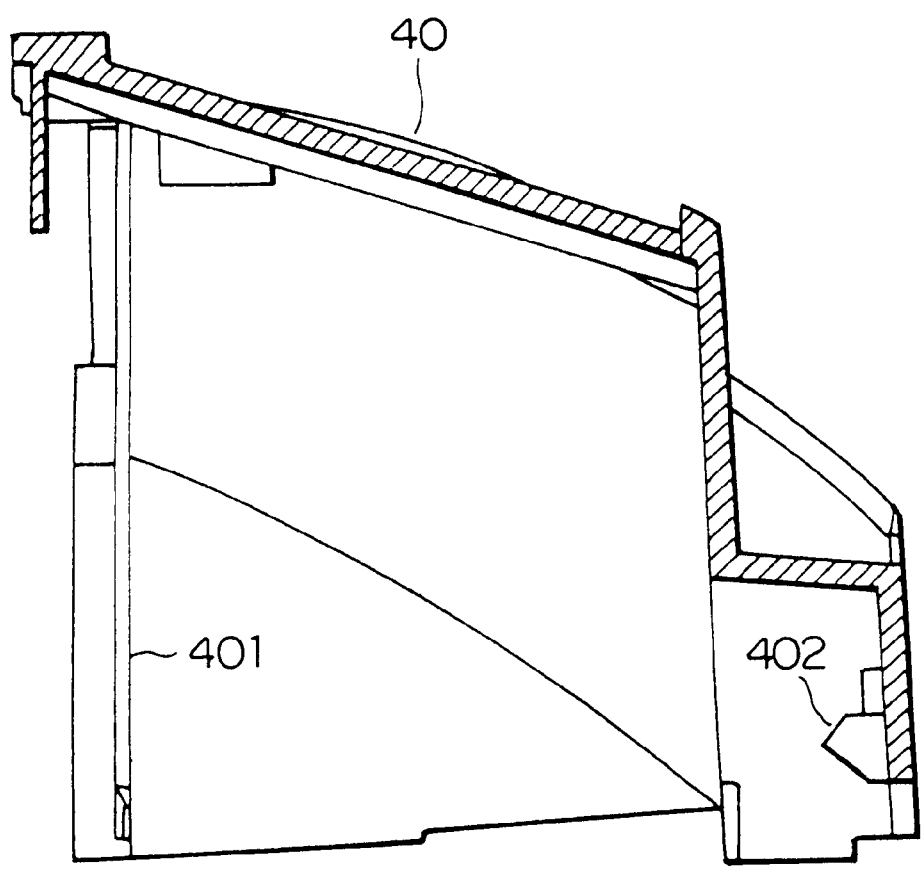

FIGS. 18 to 20 show an example of the rear connection cover 40. Among these drawings, FIG. 18 is a rear view of the rear connection cover 40 (as viewed toward the flat-bed-type document scanner 10); FIG. 19 is a front view of the rear connection cover 40 (as viewed from the flat-bed-type document scanner 10); and FIG. 20 is a cross section of the rear connection cover 40 as viewed from the side thereof.

As shown in FIGS. 18 to 20, the rear connection cover 40 has two guide ribs 401 formed on the inner surfaces of opposite side walls; two engagement projections 402 provided on the inner surface of the rear wall; and two through-holes 403 formed in the rear wall. As shown in FIG. 20, the engagement projections 402 each have a tapered tip end, in order to enable smooth engagement.

The rear connection cover 40 having the above-described structure is fitted onto the assembly structure member 50, while the guide ribs 401 are brought into engagement with the surface C of the assembly structure member 50 shown in FIG. 3. When the engagement projections 402 are engaged with the openings of the flat portions 504 shown in FIG. 3, positioning for attachment is completed. Subsequently, screws are inserted into the through-holes 403 and are screwed into the screw holes 503 of the assembly structure member 50 shown in FIG. 4. Thus, the rear connection cove 40 is fixed to the assembly structure member 50.

In this manner, the rear connection cover 40 covers the exposed portions of the assembly structure member 50 and the bottom structure member 60, which portions would otherwise be exposed on the rear side. Therefore, the image scanner obtained through assembly of the flat-bed-type document scanner 10 and the automatic-paper-feed-type document scanner 20 can have an appearance as if it were manufactured as a single-body apparatus.

As have been described with reference to FIG. 1, in the image scanner 1 according to the present invention, the hopper 3 for stacking documents to be read is disposed to project from the apparatus body; and in place of a stacker which have been used in conventional scanners, a document holding cover 11 provided on the platen 2 of the flat-bed-type document scanner 10 is used as a location to which documents are transported after being read.

Figure 33:
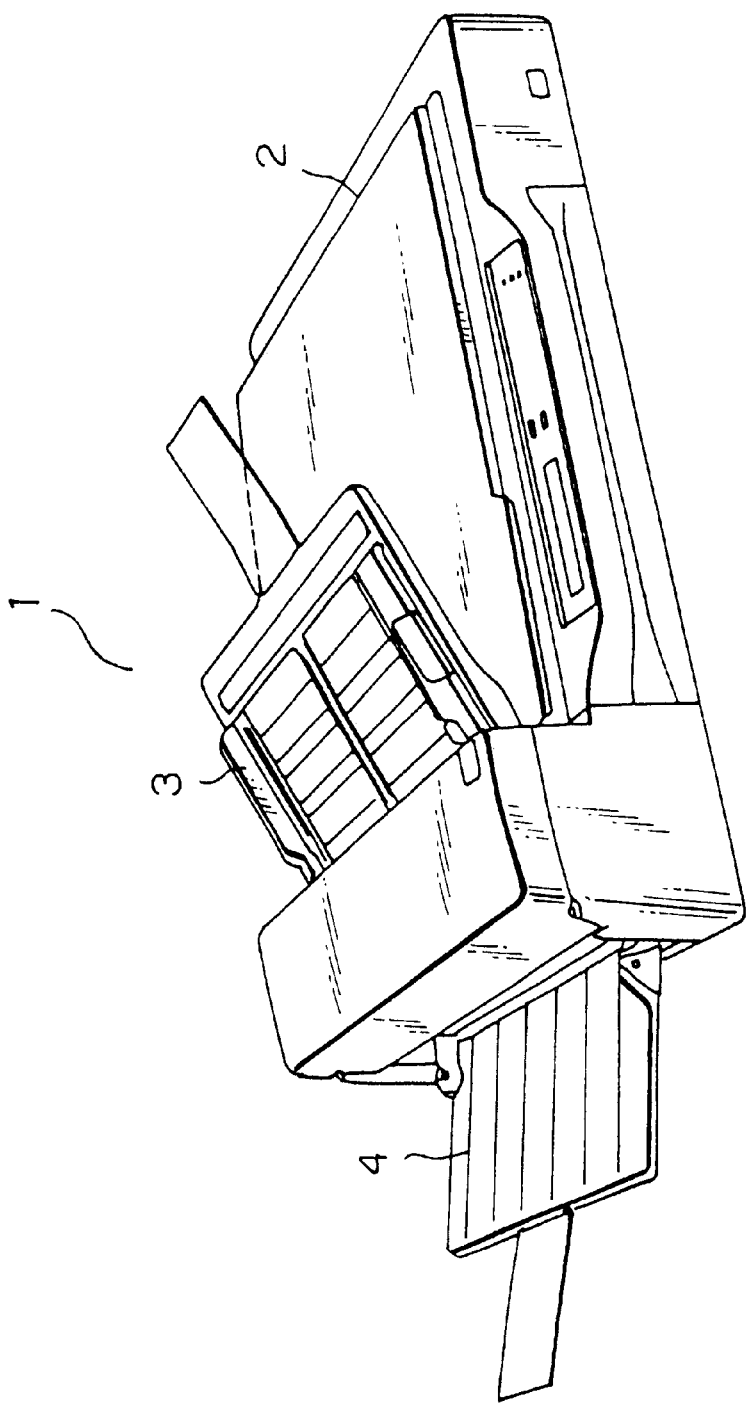
FIG. 33 is an explanatory view showing a conventional dual-function image scanner.

In this case, since the hopper 3 can be disposed at a larger slant angle as compared with the stacker 4 of the conventional scanner (FIG. 33) in which the stacker 4 is disposed to project from the apparatus body, the overall length of the apparatus can be decreased greatly as compared with the conventional scanner.

Next will be described the structure employed by the image scanner 1 according to the embodiment of the present invention in order to enable the above-described document transport.

Figure 21:
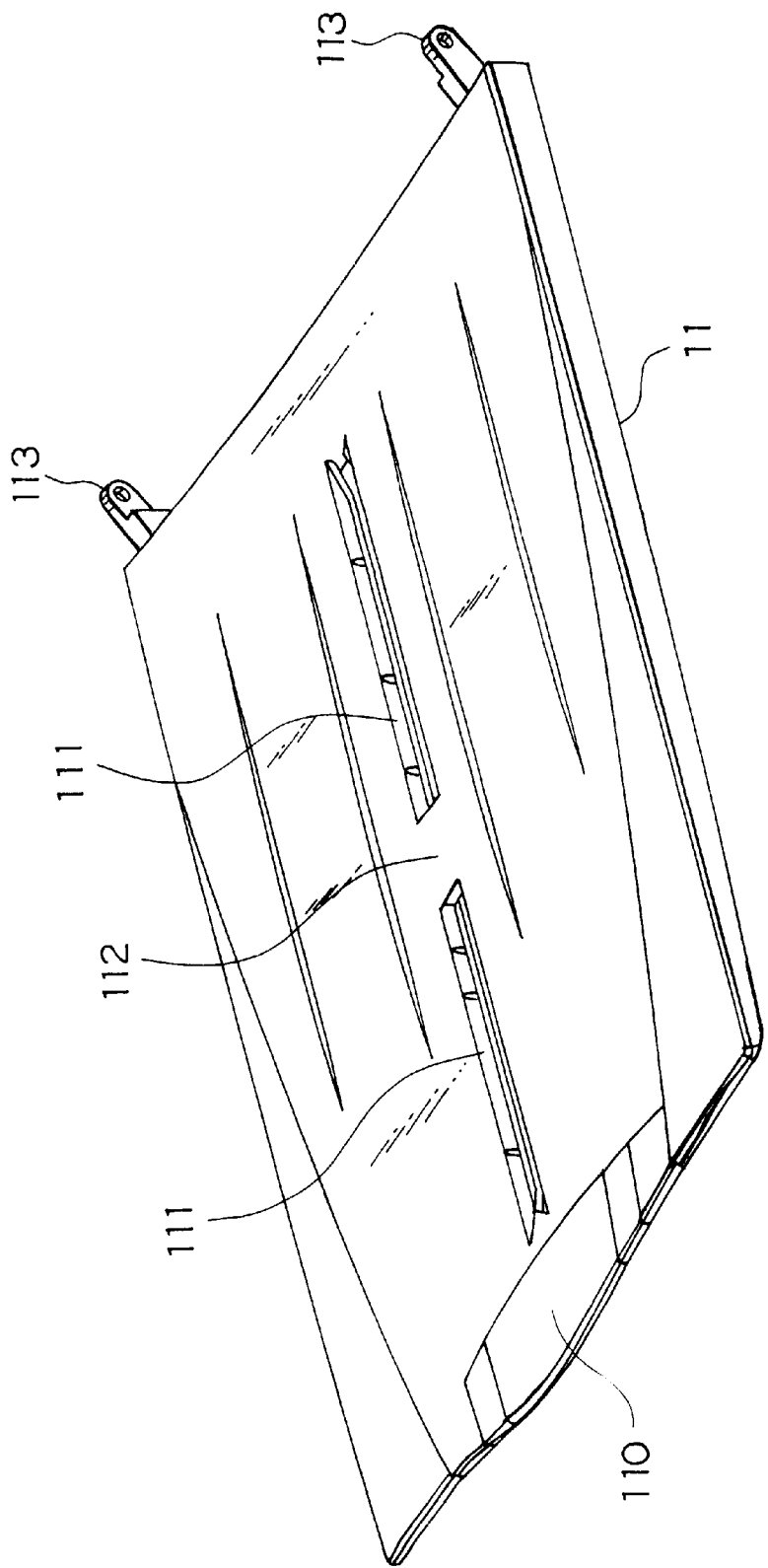
FIGS. 21 and FIG. 22 show an example of a document holding cover.

FIG. 21 shows an example of the document holding cover 11 used in place of the stacker 4.

The document holding cover 11 has a size of about 400 mm (length)×about 300 mm (width). As shown in FIG. 21, in addition to a holding projection 110 which a user holds, the document holding cover 11 has a stopper groove 111 having a size of about 15 mm (width)×about 280 mm (length)×about 5 mm (depth); a bridge portion 112 provided on the surface of the cover to cross the stopper groove 111 at its longitudinal center; and two connection arms 113 which are provided at right and left ends of an end portion of the document holding cover 11 located on the side of the front connection cover 30 and which project outward and upward.

Figure 22:
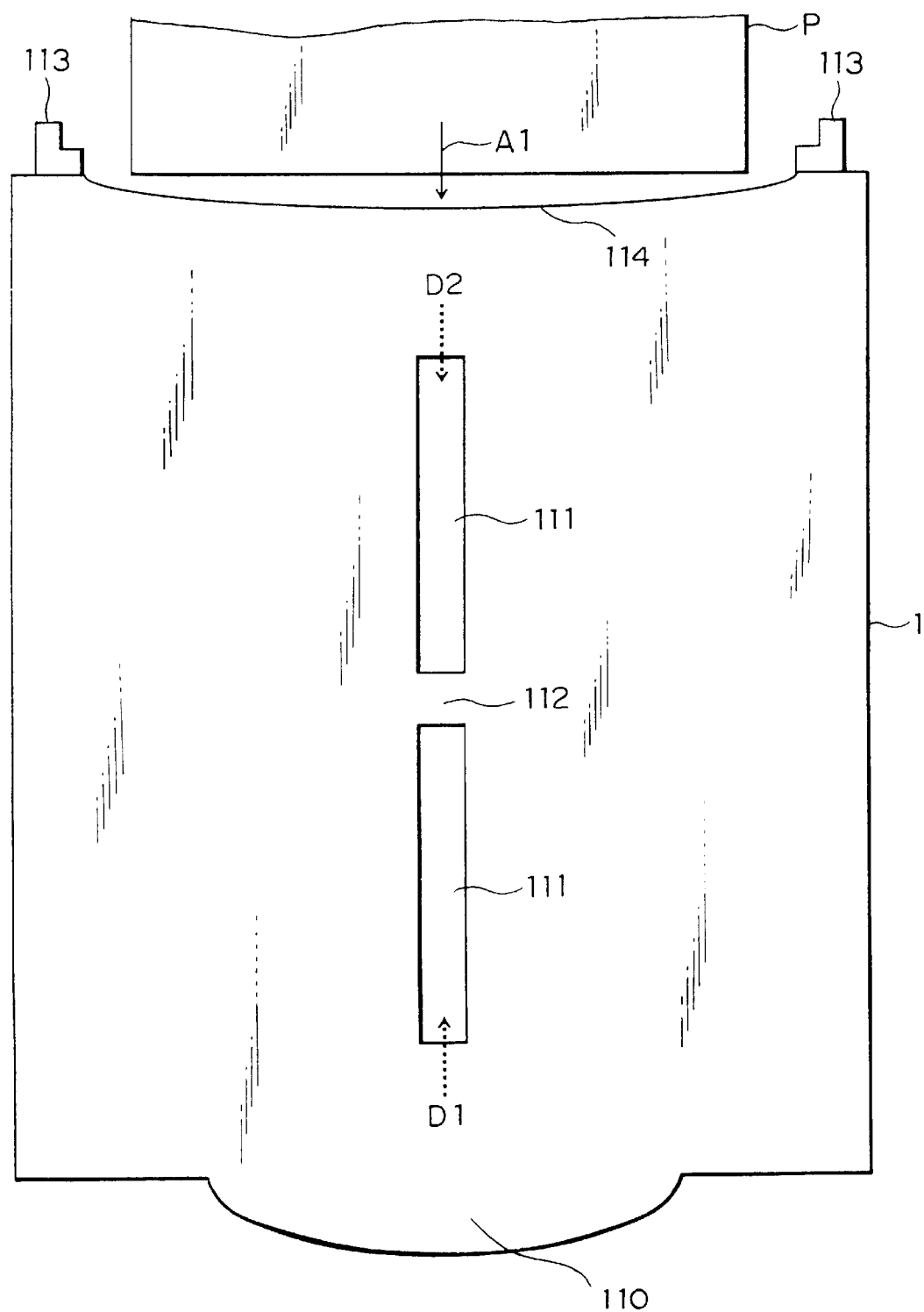

Although not shown clearly in FIG. 21, the end portion of the document holding cover 11 located on the side of the front connection cover 30 has a concave shape 114, which, as shown in FIG. 22, is concavely curved toward the document transport direction. The concave shape prevents a document P which is transported from the automatic-paper-feed-type document scanner 20 in the direction of arrow A1 from falling in the gap between the document holding cover 11 and the front connection cover 30.

That is, when the end portion of the document holding cover 11 located on the side of the front connection cover 30 has a concave shape curved toward the document transport direction, opposite transverse end portions of the document P which is transported from the automatic-paper-feed-type document scanner 20 are reliably received by the document holding cover 11, so that the transported document P does not fall in the gap between the document holding cover 11 and the front connection cover 30.

Figure 23A:
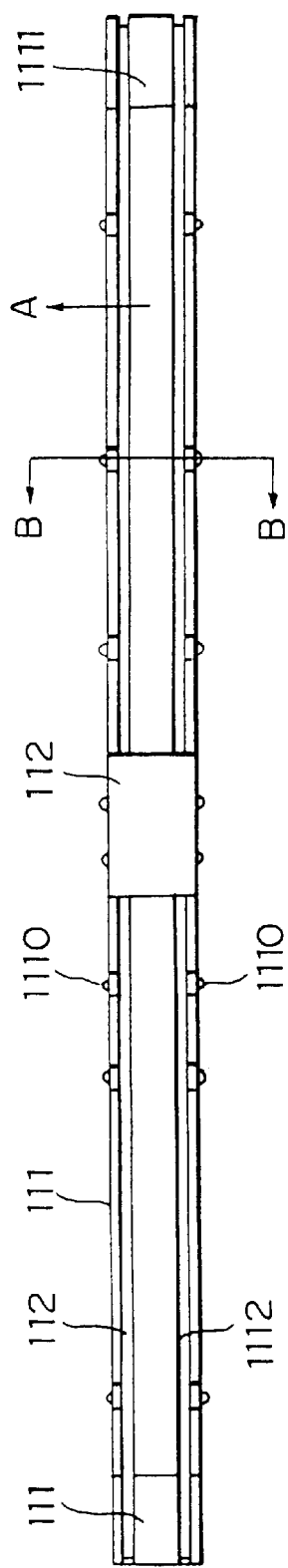
FIGS. 23A–23C show an example of a stopper groove.
Figure 23B:
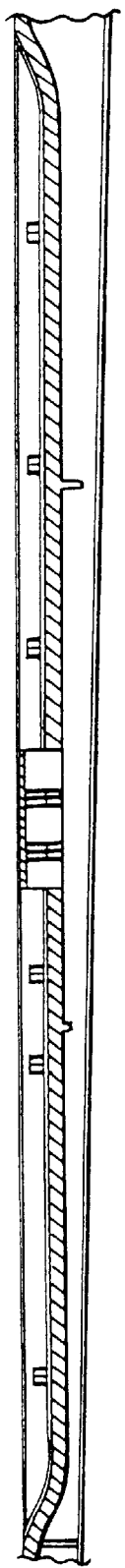
Figure 23C:
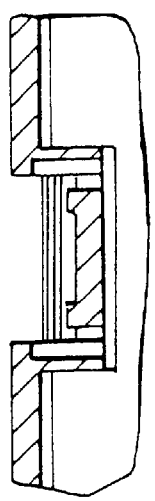

FIGS. 23A to 23C show an example of the stopper groove 111 formed on the document holding cover 11. Among these drawings, FIG. 23A shows a cross section of the stopper groove 111 at a predetermined depth; FIG. 23B shows a cross section as viewed in the direction of arrow A in FIG. 23A; and FIG. 23C shows a cross section taken along line B—B in FIG. 23A.

Figure 24:
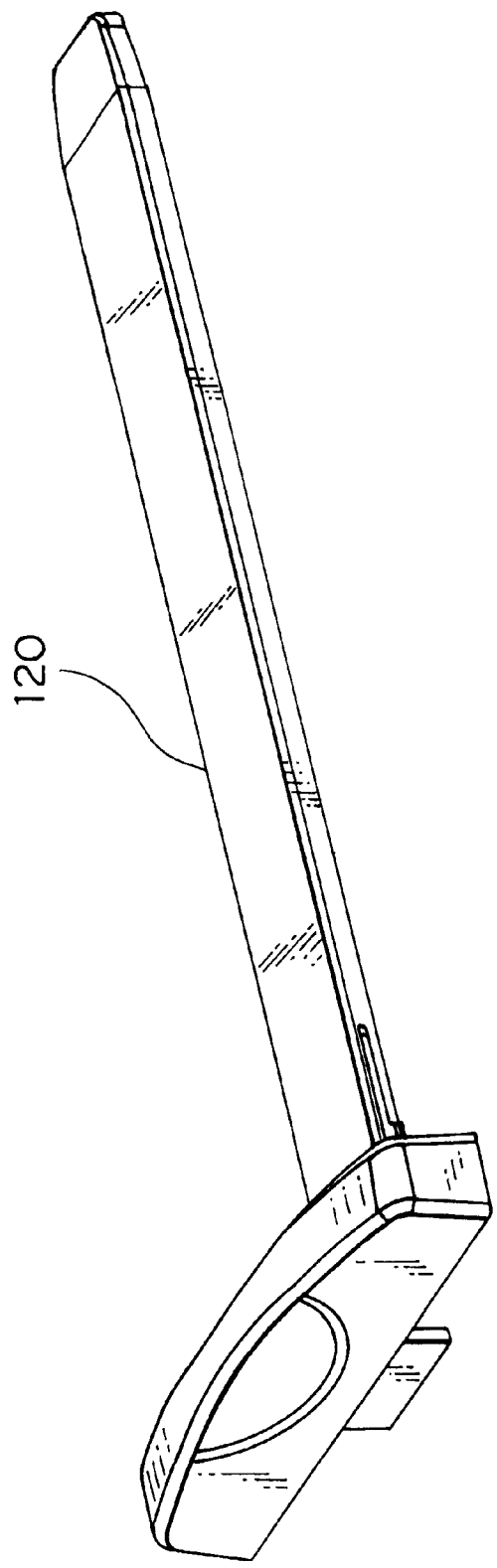
FIGS. 24 and 25A–25C show an example of a document stopper.

As shown in FIGS. 23A to 23C, the stopper groove 111 formed in the document holding cover 11 has, on either side wall, eight engagement depressions 1110 at positions corresponding to different document sizes. At either longitudinal end of the stopper groove 111, a guide taper 1111 is formed to be smoothly continuous with the top face of the document holding cover 11. Further, two guide rails 1112 are formed on the bottom of the stopper groove 111. A document stopper 120 having a shape as shown in FIG. 24 is fitted into the stopper groove 111 having the above-described structure.

Figure 25A:
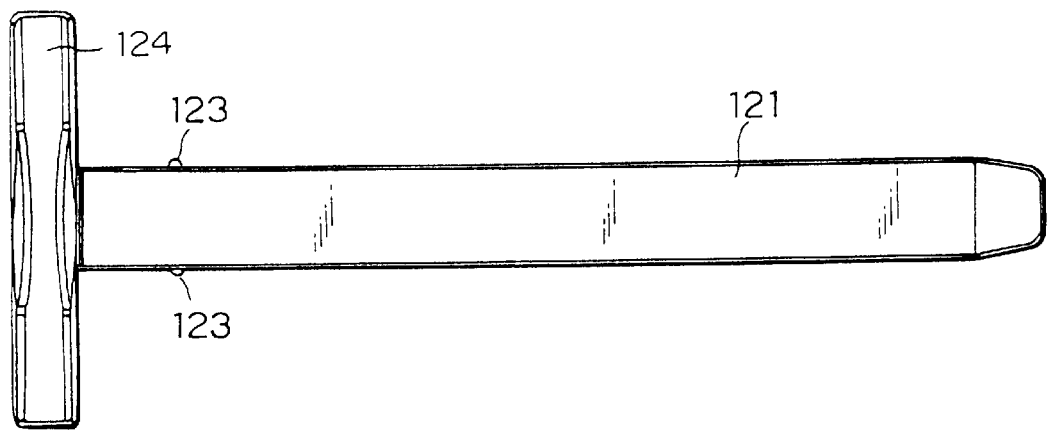
Figure 25B:
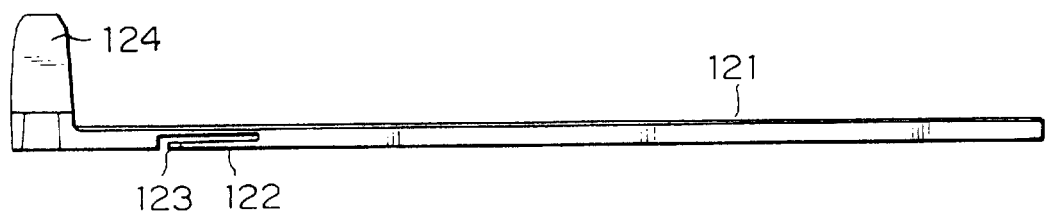
Figure 25C:
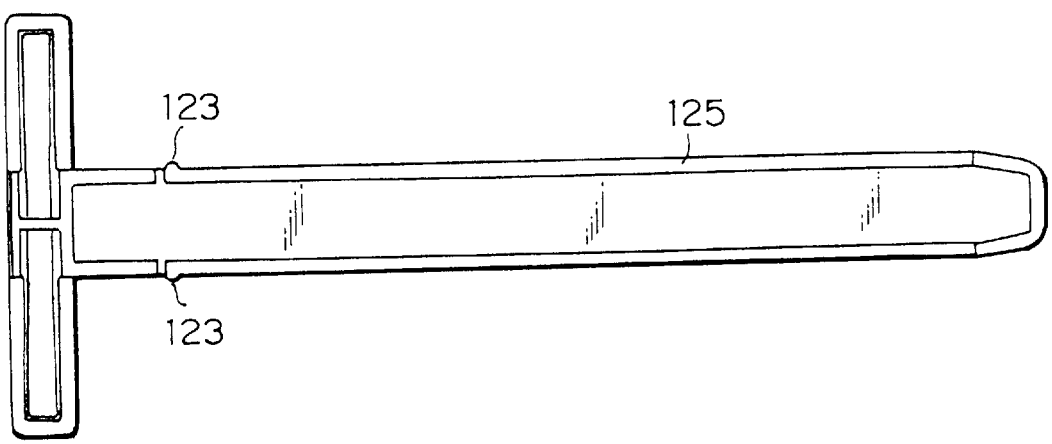

FIGS. 25A to 25C show the detailed structure of the document stopper 120. Among these drawings, FIG. 25A is a plan view of the document stopper 120; FIG. 25B is a side view of the document stopper 120; and FIG. 25C is a bottom view of the document stopper 120.

As shown in FIGS. 25A to 25C, the document stopper 120 has a base portion 121 to be fitted into the stopper groove 111; two flexible engagement levers 122 formed through partial removal of the base portion 121; engagement claws 123 which project from the tip ends of the engagement levers 122 and are adapted to be engaged with the engagement depression 1110 of the stopper groove 111; and a document stopping portion 124 which projects upward from the base portion 121.

Figure 26:
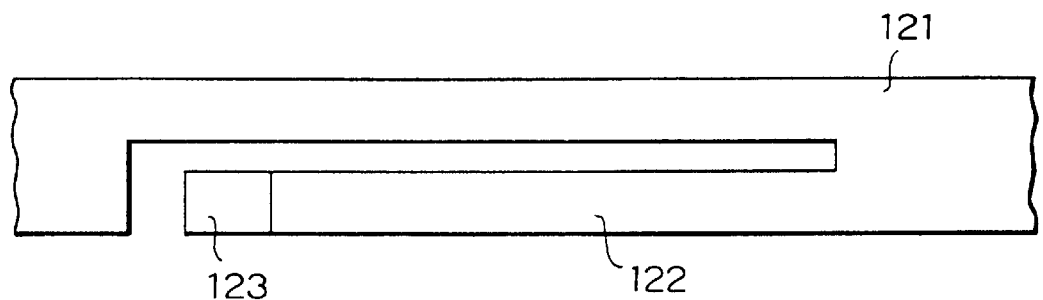
FIG. 26 shows an example of an engagement lever.

As shown in FIG. 25C, each of the engagement levers 122 is formed at a rim portion 125 which is formed on the bottom face of the base portion 121 along the circumferential edge thereof. As shown in FIG. 26, an L-shaped cut-out is formed in the rim portion 125 to form the engagement lever 122. The space between the engagement lever 122 and the base portion 121 is rendered as small as possible in order to prevent application of a large force on the engagement lever 122 when the base portion 121 is fitted into the stopper groove 111.

Figure 27A:
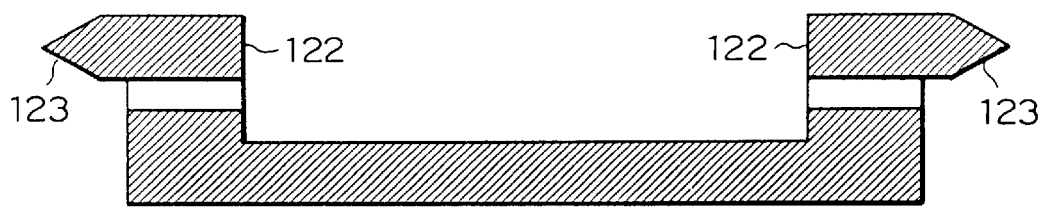
FIGS. 27A and 27B show an example of an engagement claw.

As shown in FIG. 27A, the engagement claws 123 formed at the tip ends of the engagement levers 122 are tapered toward their tip ends in order to enable smooth insertion of the base portion 121 into the stopper groove 111.

Figure 27B:
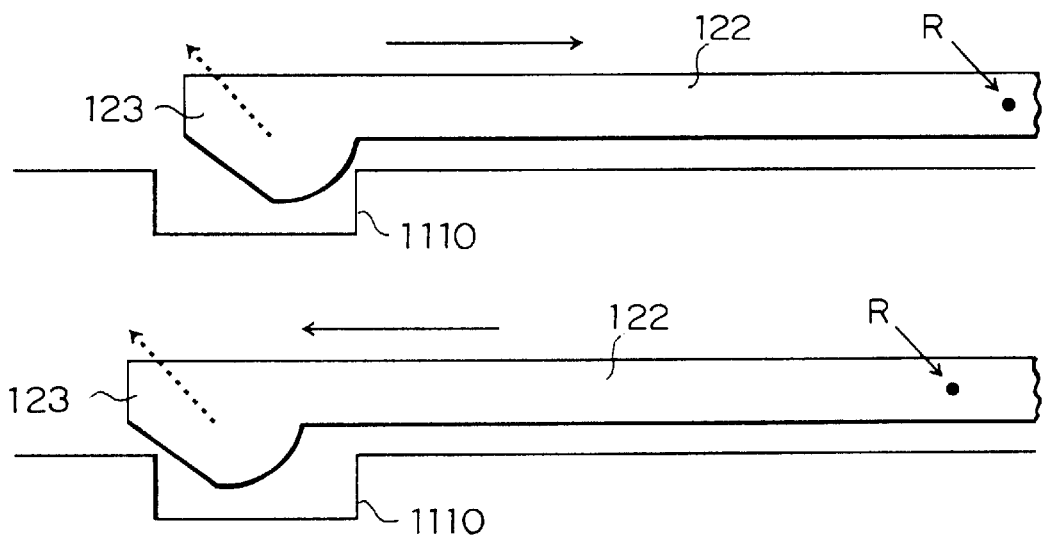

Further, as shown in FIG. 27B, the engagement claws 123 formed at the tip ends of the engagement levers 122 each have a rounded engagement surface on the side facing the pivoting center R of the engagement lever 122, and an inclined straight engagement surface on the side opposite the pivoting center R. The rounded engagement surface enables the base portion 121 to move smoothly along the stopper groove 111. The inclined engagement surface enables the engagement claw 123 to smoothly disengage from the engagement depression 1110, as indicated by broken lines in FIGS. 27B and 27C, upon movement of the base portion 121.

The document stopper 120 having the above-described structure is inserted into the stopper groove 111 and is stopped at a designated position at which the engagement claws 123 engage the engagement depressions 1110. Thus, upon engagement, the document stopper 120 is ready for stopping documents transported from the automatic-paper-feed-type document scanner 20 by the document stopping portion 124.

During the insertion operation, the guide taper 1111 of the stopper groove 111 enables smooth insertion of the document stopper 120 into the stopper groove 111. Further, the guide rails 1112 of the stopper groove 111 enable smooth travel of the document stopper 120 within the stopper groove 111.

Once the document stopper 120 is stopped at a designated position through engagement of the engagement claws 123 with the engagement depressions 1110, the document stopper 120 remains in the stopper groove 111 even when the document holding cover 11 is opened, because the document stopper 120 is held by the engagement and by the bridge portion 112.

As shown in FIG. 22, the document stopper 120 can be inserted into the stopper groove 111 from either of the opposite longitudinal ends thereof; i.e., in an insertion direction D1 or in an insertion direction D2. Therefore, as shown in FIGS. 28A and 28B, the document stopping portion 124 can be moved on the document holding cover 11 over a wide range in order to cope with various sizes of documents to be read by the automatic-paper-feed-type document scanner 20. Arrow A1 in FIGS. 28A and 28B indicates the document transport direction.

Next, a mechanism for enabling opening and closing of the document holding cover 11 will be described.

As shown in FIG. 21, the document holding cover 11 has the two connection arms 113, which are provided at right and left ends of the end portion of the document holding cover 11 located on the side of the front connection cover 30 and which project outward and upward.

Figure 29A:
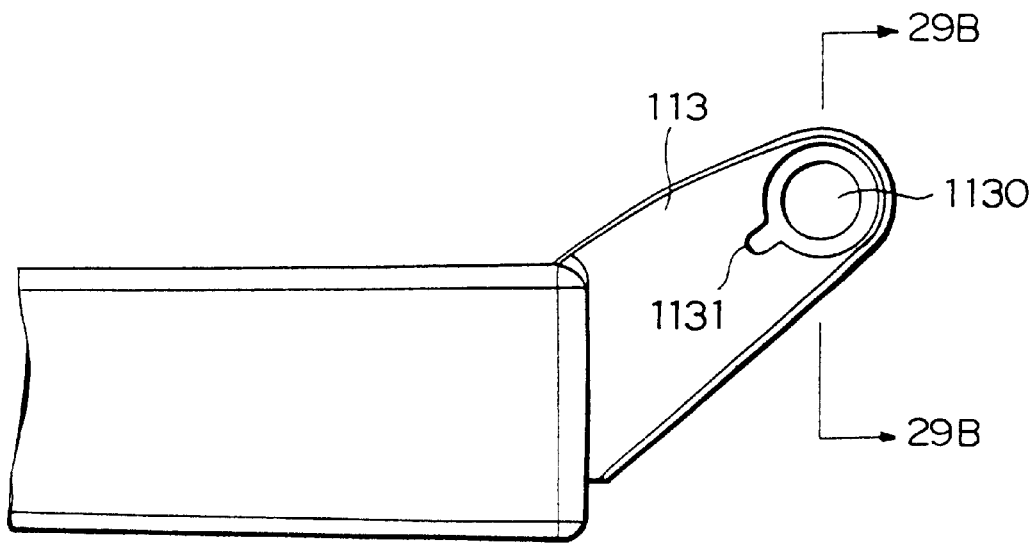
FIGS. 29A and 29B show an example of connection arms.
Figure 29B:
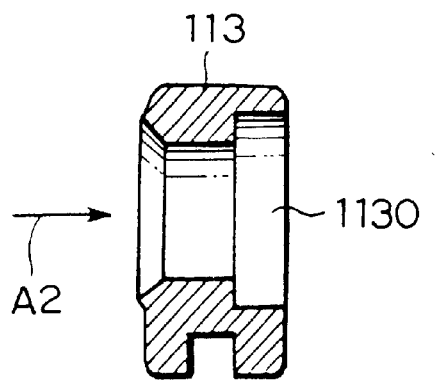

FIGS. 29A and 29B show an example of the connection arms 113. Among these drawings, FIG. 29A is a side view of a connection arm 113; and FIG. 29B shows a cross section taken along line 29B—29B in FIG. 29A.

As shown in FIGS. 29A and 29B, the connection arm 113 has a through-hole 1130 at its distal end. As shown in FIG. 29B, the through-hole 1130 has an insertion taper portion on an entrance side (side from which a rotary shaft member 130, which will be described later, is inserted into the through-hole 1130). The through-hole 1130 has a diameter equal to the minimum diameter of the taper portion at an axially intermediate portion and has a larger diameter on the exit side. Further, as shown in FIG. 29A, a cut-out 1131 is formed on the exit side to be continuous with the larger diameter portion of the through-hole 1130. In FIG. 29B, arrow A2 indicates the direction of insertion of the rotary shaft member 130.

Figure 30C:
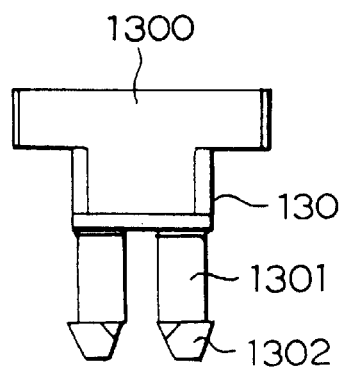
FIGS. 30A–30C show an example of a rotary shaft member.
Figure 30A:
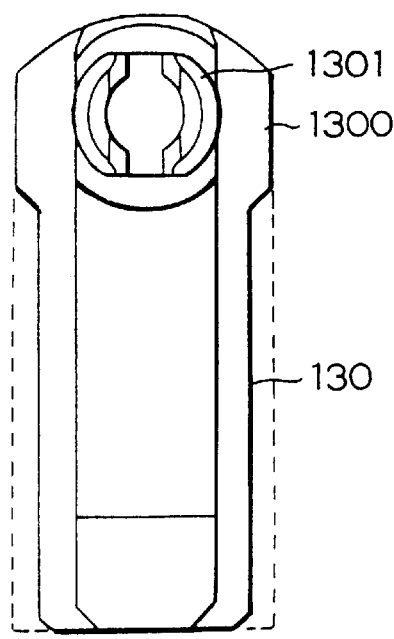
Figure 30B:
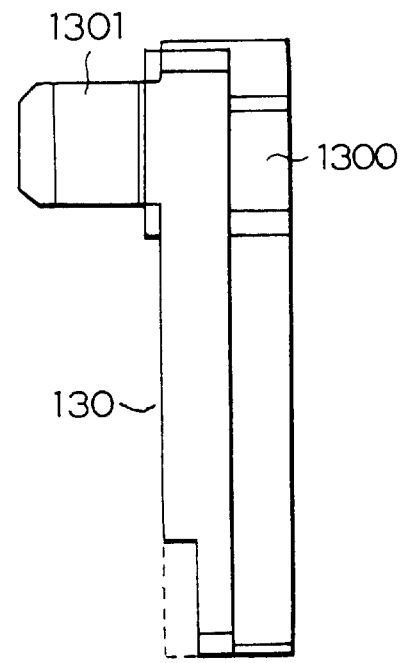

FIGS. 30A to 30C show an example of the rotary shaft member 130, which is inserted into the through-hole 1130 of the connection arm 113. Among these drawings, FIG. 30A is a front view of the rotary shaft member 130, FIG. 30B is a side view of the rotary shaft member 130, and FIG. 30C is a top view of the rotary shaft member 130.

As shown in FIGS. 30A to 30C, the rotary shaft member 130—which is inserted into the through-hole 1130 of the connection arm 113—has a slider portion 1300 serving as a base body and having a T-shaped cross section, and a cylindrical portion 1301 projecting from the slider portion 1300 and being divided into two portions.

As indicated by broken lines in FIG. 30A, left and right portions of the slider portion 1300 as viewed from the front side are removed in order to form a stepped shape having a narrowed distal end. Further, as indicated by a broken line in FIG. 30B, a front portion of the slider portion 1300 as viewed from the front side is removed in order to form a stepped shape having a narrowed distal end and a stepped portion at a position different from the position of stepped portions formed on the left and right portions. As shown in FIG. 30C, a tapered removal-preventing portion 1302 having a larger diameter is formed at the distal end of the cylindrical portion 1301. The slider portion 1300 may be formed in a tapered shape such that the cross-sectional area decreases toward its distal end, rather than in a stepped shape.

Since the cylindrical portion 1301 of the rotary shaft member 130 having the above-described structure is divided into two pieces, the cylindrical portion 1301 is free to expand and contract. Therefore, when the cylindrical portion 1301 is inserted into the through-hole 1130 of the connection arm 113 and the removal-preventing portion 1302 reaches the exit portion of the through-hole 1130 having a larger diameter, the removal-preventing portion 1302 restores its original shape. Thus, the rotary shaft member 130 is rotatably attached to the connection arm 113.

The length of the cylindrical portion 1301 is determined such that the tip end of the cylindrical portion 1301 does not project from the through-hole 1130 of the connection arm 113 after insertion of the cylindrical portion 1301 into the through-hole 1130. When the rotary shaft member 130 is removed from the connection arm 113, a pin or a like object is inserted into the cut-out 1131 provided at the exit portion of the through-hole 1130 in order to contract the cylindrical portion 1301, to thereby enable removal of the rotary shaft member 130.

When the slider portions 1300 are oriented perpendicular to the document holding cover 11 after insertion of the rotary shaft members 130 into the connection arms 113, as shown in FIG. 31, the slider portions 1300 each have a T-shaped cross section as viewed from directly above the slider portions 1300.

As shown in FIGS. 15A and 15B, the front connection cover 30—which is provided in order to cover the exposed portions of the assembly structure member 50 and the bottom structure member 60—has the two cut-out spaces 300 which accommodate the connection arms 113 with the rotary shaft member 130 such that the connection arms 113 can move vertically. Thus, vertical, parallel movement of the document holding cover 11 is enabled in order to cope with cases in which the flat-bed-type document scanner 10 reads a thick document such as a book.

As have been described with reference to FIGS. 30A to 30C, the slider portion 1300 serving as a base portion of the rotary shaft member 130 has a stepped shape having a narrowed distal end. This structure solves the drawback such that if the slider portion 1300 is closely fitted into the cut-out spaces 300, the slider portion 1300 becomes difficult to move horizontally, resulting in difficulty in coping with cases in which a thick document such as a book is to be read. Further, as have been described with reference to FIGS. 30A to 30C, the positions of the stepped portions on the left and right faces are rendered different from that of the stepped portion on the front face of the slider portion 1300 (or, put another way, the timing of engagement of the stepped portions on the left and right faces with the wall of the cut-out spaces 300 is rendered different from that of the stepped portion on the front face of the slider portion 1300). This facilitates insertion of the slider portion 1300 into the cut-out spaces 300 when a thick document such as a book is to be read.

Figure 32A:
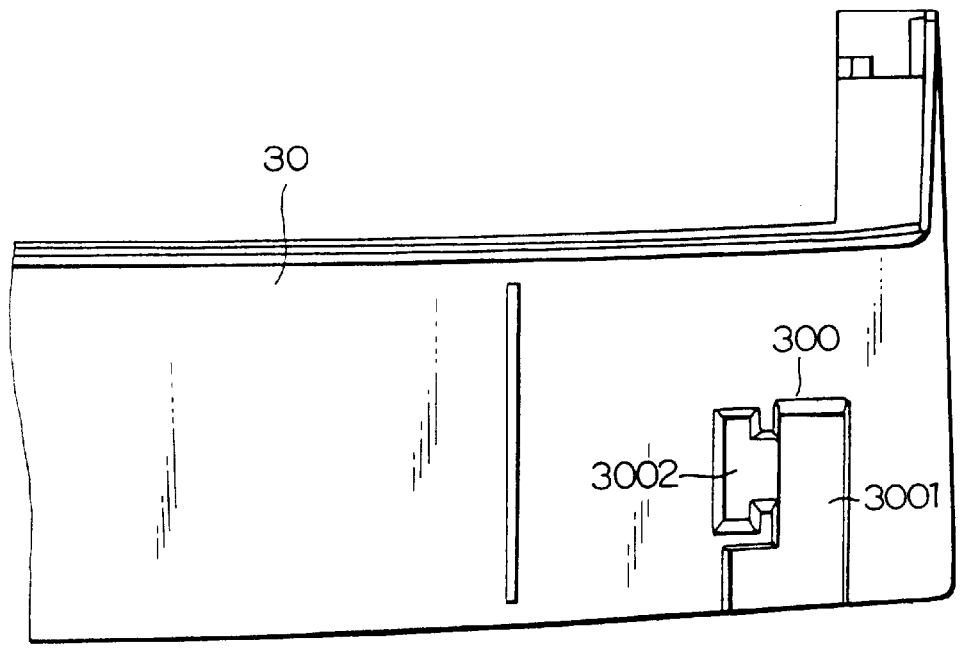
FIGS. 32A and 32B show an example of a front connection cover.
Figure 32B:
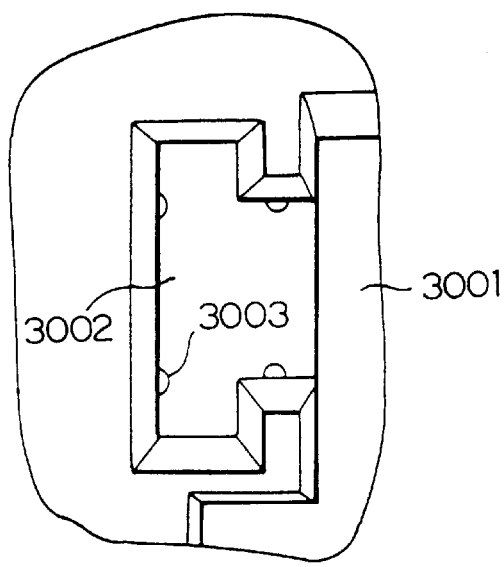

FIGS. 32A and 32B show the details of a cut-out space 300 formed in the front connection cover 30. Among these drawings, FIG. 32A is a top view of the front connection cover 30, and FIG. 32B is an enlarged view of a portion of the cut-out space 300.

As shown in FIG. 32A, the cut-out space 300 formed in the front connection cover 30 has a first accommodation space 3001 for accommodating the connection arm 113, and a second accommodation space 3002 for accommodating the slider portion 1300 (serving as the base portion of the rotary shaft member 130) having a T-shaped cross section. Further, as shown in FIG. 32B, four guide ribs 3003 are formed on the wall of the second accommodation space 3002 in order to eliminate the influence of warpage of the molded slider portion 1300, which warpage would otherwise raise a problem when the slider portion 1300 is inserted into the second accommodation space 3002.

Since the front connection cover 30 has the cut-out spaces 300 having the above-described structure, the connection arm 113—into which the rotary shaft member 130 has been inserted with the orientation as shown in FIG. 31—an be inserted into the cut-out spaces 300.

Since the cylindrical portions 1301 of the rotary shaft members 130 are inserted into the through-holes 1130 of the connection arms 113, the connection arms 113 become pivotable to thereby enable opening and closing of the document holding cover 11.

The connection arms 113 and the rotary shaft members 130 inserted into the cut-out spaces 300 can be moved vertically. Therefore, when a user uses the flat-bed-type document scanner 10 to scan a thick document such as a book, the user can move the document holding cover 11 vertically according to the thickness of the document. Thus, the scanning operation can be performed without application of excessive force to the document holding cover 11.

In the above-described structure, the slider portion 1300 serving as the base portion of the rotary shaft member 130 has a T-shaped cross section, and the second accommodation space 3002 of each cut-out space 300 has a T-shaped cross section. This structure prevents rotation of the document holding cover 11. Specifically, as is understood from FIG. 31, since a rotation prevention structure having a T-shaped cross section is provided at each of the left and right ends of the document holding cover 11, rotation (about a vertical axis) of the document holding cover 11 is prevented.

Although the present invention has been described with reference to the illustrated embodiment, the present invention is not limited thereto. For example, in the embodiment, the bottom structure member 60 is used to constitute the bottom of the automatic-paper-feed-type document scanner 20; and the bottom structure member 60 is attached to the assembly structure member 50 to thereby assemble together the flat-bed-type document scanner 10 and the automatic-paper-feed-type document scanner 20. However, the following structure may be employed. A different structure member which does not constitute the bottom of the automatic-paper-feed-type document scanner 20 is prepared, and is fixed to the bottom face of the automatic-paper-feed-type document scanner 20 by use of screw holes for rubber feet provided on the bottom face of the automatic-paper-feed-type document scanner 20.

As described above, the present invention enables assembly of- a flat-bed-type document scanner fabricated as a single-body apparatus and an automatic-paper-feed-type document scanner fabricated as a single-body apparatus, in such a manner that the completed image scanner appears as if it were fabricated as a single-body apparatus. Therefore, a scanner manufacture becomes possible to provide an image scanner having two functions; i.e., a function of a flat-bed-type document scanner and a function of an automatic-paper-feed-type document scanner, though assembly of an existing flat-bed-type document scanner and an existing automatic-paper-feed-type document scanner. Thus, burdens imposed on a manufacture, such as a design burden and a manufacture burden, can be reduced considerably.

What is claimed is:

1. An image scanner comprising:
    a flat-bed-type scanner having a casing thereof;
    an automatic-paper-feed-type scanner;
    an assembly component prepared as a component which constitutes the automatic-paper-feed-type scanner or a component to be attached to the automatic-paper-feed-type scanner; and
    an assembly structure member having squarish U-shaped cross section corresponding to an external shape of the casing of the flat-bed-type scanner, being adapted to be fitted onto the casing, having an engagement portion which positions the assembly component, and having a fixation portion which fixes the assembly component, the squarish U-shaped cross section having an opening,
    wherein the assembly component constituting or being attached to the automatic-paper-feed-type scanner is engaged at the engagement portion with the assembly structure member and fixed at the fixation portion with the assembly structure member,
    wherein the assembly structure member is fitted to the casing of the flat-bed-type scanner through the opening of the squarish U-shaped cross section, and
    wherein the flat-bed-type scanner and the automatic-paper-feed-type scanner are assembled integrally with each other.

2. An image scanner according to claim 1, further comprising:
    a cover member disposed to cover the assembly structure member and the assembly component and fixed to the assembly structure member.

3. An image scanner according to claim 2, further comprising:
    a reinforcement member formed separately from the assembly structure member, the reinforcement member having a hook portion to be engaged with a groove formed on the bottom face of the flat-bed-type scanner and being fixed to the assembly structure member.

4. An image scanner according to claim 2, wherein the assembly structure member has a hook portion to be engaged with a groove formed on the bottom face of the flat-bed-type scanner.

5. An image scanner according to claim 2, wherein the assembly component has a flat projection having a cut-out portion at its tip end and serving as an engagement member to be engaged with an engagement portion of the assembly structure member.

6. An image scanner according to claim 2, wherein opposite transverse end portions of the assembly component are bent downward such that the assembly component has a squarish U-shaped cross section.

7. An image scanner according to claim 2, wherein a plurality of cover members are provided in order to cover the assembly structure member and the assembly component.

8. An image scanner according to claim 2, wherein the cover member is formed of a molded component having guide ribs and engagement portions, the cover member being engaged with the assembly structure member by use of the guide ribs and the engagement portions and being fixed to the assembly structure member by use of screws.

9. An image scanner according to claim 1, further comprising:
    a reinforcement member formed separately from the assembly structure member, the reinforcement member having a hook portion to be engaged with a groove formed on the bottom face of the flat-bed-type scanner and being fixed to the assembly structure member.

10. An image scanner according to claim 9, wherein the assembly structure member has a hook portion to be engaged with a groove formed on the bottom face of the flat-bed-type scanner.

11. An image scanner according to claim 9, wherein the assembly component has a flat projection having a cut-out portion at its tip end and serving as an engagement member to be engaged with an engagement portion of the assembly structure member.

12. An image scanner according to claim 9, wherein opposite transverse end portions of the assembly component are bent downward such that the assembly component has a squarish U-shaped cross section.

13. An image scanner according to claim 9, wherein a plurality of cover members are provided in order to cover the assembly structure member and the assembly component.

14. An image scanner according to claim 9, wherein the cover member is formed of a molded component having guide ribs and engagement portions, the cover member being engaged with the assembly structure member by use of the guide ribs and the engagement portions and being fixed to the assembly structure member by use of screws.

15. An image scanner according to claim 1, wherein the assembly structure member has a hook portion to be engaged with a groove formed on the bottom face of the flat-bed-type scanner.

16. An image scanner according to claim 15, wherein the assembly component has a flat projection having a cut-out portion at its tip end and serving as an engagement member to be engaged with an engagement portion of the assembly structure member.

17. An image scanner according to claim 15, wherein opposite transverse end portions of the assembly component are bent downward such that the assembly component has a squarish U-shaped cross section.

18. An image scanner according to claim 15, wherein a plurality of cover members are provided in order to cover the assembly structure member and the assembly component.

19. An image scanner according to claim 15, wherein the cover member is formed of a molded component having guide ribs and engagement portions, the cover member being engaged with the assembly structure member by use of the guide ribs and the engagement portions and being fixed to the assembly structure member by use of screws.

20. An image scanner according to claim 1, wherein the assembly component has a flat projection having a cut-out portion at its tip end and serving as an engagement member to be engaged with an engagement portion of the assembly structure member.

21. An image scanner according to claim 20, wherein opposite transverse end portions of the assembly component are bent downward such that the assembly component has a squarish U-shaped cross section.

22. An image scanner according to claim 20, wherein a plurality of cover members are provided in order to cover the assembly structure member and the assembly component.

23. An image scanner according to claim 20, wherein the cover member is formed of a molded component having guide ribs and engagement portions, the cover member being engaged with the assembly structure member by use of the guide ribs and the engagement portions and being fixed to the assembly structure member by use of screws.

24. An image scanner according to claim 1, wherein opposite transverse end portions of the assembly component are bent downward such that the assembly component has a squarish U-shaped cross section.

25. An image scanner according to claim 24, wherein a plurality of cover members are provided in order to cover the assembly structure member and the assembly component.

26. An image scanner according to claim 24, wherein the cover member is formed of a molded component having guide ribs and engagement portions, the cover member being engaged with the assembly structure member by use of the guide ribs and the engagement portions and being fixed to the assembly structure member by use of screws.

27. An image scanner according to claim 1, wherein a plurality of cover members are provided in order to cover the assembly structure member and the assembly component.

28. An image scanner according to claim 27, wherein the cover member is formed of a molded component having guide ribs and engagement portions, the cover member being engaged with the assembly structure member by use of the guide ribs and the engagement portions and being fixed to the assembly structure member by use of screws.

29. An image scanner according to claim 1, wherein the cover member is formed of a molded component having guide ribs and engagement portions, the cover member being engaged with the assembly structure member by use of the guide ribs and the engagement portions and being fixed to the assembly structure member by use of screws.

30. An image scanner comprising:
a flat-bed-type scanner having a casing thereof;
an automatic-paper-feed-type scanner;
an assembly component prepared as a component which constitutes the automatic-paper-feed-type scanner or a component to be attached to the automatic-paper-feed-type scanner; and
an assembly structure member having a cross-sectional shape such that the assembly structure member comes into contact with at least opposed first and second faces of the casing of the flat-bed-type scanner, being adapted to be fitted onto the casing, having an engagement portion which positions the assembly component, and a fixation portion which fixes the assembly component, the cross-sectional shape having an opening,
wherein the assembly component constituting or being attached to the automatic-paper-feed-type scanner is engaged at the engagement portion with the assembly structure member and fixed at the fixation portion with the assembly structure member,
wherein the assembly structure member is fitted to the casing of the flat-bed-type scanner through the opening of the cross sectional shape, and
wherein the flat-bed-type scanner and the automatic-paper-feed-type scanner are assembled integrally with each other.

31. An image scanner according to claim 30, further comprising:
a cover member disposed to cover the assembly structure member and the assembly component and fixed to the assembly structure member.

32. An image scanner comprising:
a flat-bed-type scanner having a casing thereof;
an automatic-paper-feed-type scanner;
an assembly component prepared as a component which constitutes the automatic-paper-feed-type scanner or a component to be attached to the automatic-paper-feed-type scanner; and
an assembly structure member having a cross-sectional shape such that the assembly structure member comes into contact with opposed first and second faces of the casing of the flat-bed-type scanner and a third face of the casing between the first and second faces, being adapted to be fitted onto the casing, having an engagement portion which positions the assembly component, and having a fixation portion which fixes the assembly component, the cross-sectional shape having an opening,
wherein the assembly component constituting or being attached to the automatic-paper-feed-type scanner is engaged at the engagement portion with the assembly structure member and fixed at the fixation portion with the assembly structure member,
wherein the assembly structure member is fitted to the casing of the flat-bed-type scanner through the opening of the cross sectional shape, and
wherein the flat-bed-type scanner and the automatic-paper-feed-type scanner are assembled integrally with each other.

33. An image scanner according to claim 32, further comprising:
a cover member disposed to cover the assembly structure member and the assembly component and fixed to the assembly structure member.

34. An image scanner according to claim 33, wherein surfaces of the assembly structure member which respectively face the first, second, and third faces of the casing of the flat-bed-type scanner are substantially perpendicular to one another.

35. An image scanner according to claim 32, wherein surfaces of the assembly structure member which respectively face the first, second, and third faces of the casing of the flat-bed-type scanner are substantially perpendicular to one another.

36. An image scanner having a flat-bed-type scanner and an automatic-paper-feed-type scanner, the image scanner comprising:

an assembly component prepared as a component which constitutes the automatic-paper-feed-type scanner or a component to be attached to the automatic-paper-feed-type scanner;

an assembly structure member having a cross-sectional shape such that the assembly structure member comes into contact with opposed first and second faces of a casing of the flat-bed-type scanner and a third face of the casing between the first and second faces and being adapted to be fitted onto the casing, the assembly structure member having an engagement portion which positions the assembly component, and a fixation portion which fixes the assembly component, so that the flat-bed-type scanner and the automatic-paper-feed-type scanner are assembled integrally with each other; and a cover member disposed to cover the assembly structure member and the assembly component and fixed to the assembly structure member, wherein surfaces of the assembly structure member which respectively face the first, second, and third faces of the casing of the flat-bed-type scanner are substantially perpendicular to one another.

\* \* \* \* \*